(12) United States Patent
Kishida

(10) Patent No.: US 6,348,950 B1
(45) Date of Patent: Feb. 19, 2002

(54) VIDEO SIGNAL PROCESSING CIRCUIT AND IMAGE PICKUP APPARATUS USING THE CIRCUIT

(75) Inventor: Takeshi Kishida, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/379,209

(22) Filed: Aug. 20, 1999

(30) Foreign Application Priority Data

Aug. 24, 1998 (JP) ............................................ 10-237413

(51) Int. Cl.$^7$ ................................................. H04N 7/01
(52) U.S. Cl. ........................................ 348/458; 348/453
(58) Field of Search ................................. 348/458, 450, 348/453, 716, 718, 582, 222, 231

(56) References Cited

U.S. PATENT DOCUMENTS

| | | | |
|---|---|---|---|
| 5,444,495 A | * 8/1995 | Takahama et al. | 348/458 |
| 5,583,575 A | * 12/1996 | Arita et al. | 348/451 |
| 5,771,074 A | * 6/1998 | Ibenthal | 348/444 |
| 5,914,753 A | * 6/1999 | Donovan | 348/441 |
| 5,973,753 A | * 10/1999 | Huetter | 348/663 |
| 6,115,673 A | * 9/2000 | Horishi et al. | 348/458 |

* cited by examiner

Primary Examiner—Victor R. Kostak
(74) Attorney, Agent, or Firm—Frommer, Lawrence & Haug LLP; William S. Frommer

(57) ABSTRACT

This invention relates to a video signal processing circuit for easily simultaneously performing conversion of the number of lines and format conversion with a simple construction and an image pickup apparatus such as CCD using the circuit. A signal in a 4:2:2 format is supplied to a linear interpolating unit. Input luminance signals and input color difference signals of one line are written into line memories and the input luminance signals and the input color difference signals of the next one line are written into other memories. Similarly, signals are alternately written. The input luminance signal is read twice from the above memories in a period of writing signals of one line. The obtained signals are multiplied by coefficients for linear interpolation, respectively, and the resultant signals are added, thereby generating a luminance signal to be outputted. At the occasion of reading the input luminance signal twice, the input color difference signal is read once from the above memories and multiplied by each of coefficients, and the resultant signals are added, thereby generating a color difference signal to be outputted. A writing/reading control of a signal to/from memories and setting of the coefficients are performed by an interpolation control unit. Thus, the number of lines can be changed in a real time manner and the signal can be converted into a signal in a 4:2:0 format.

6 Claims, 16 Drawing Sheets

| INPUT | | | | OUTPUT |
|---|---|---|---|---|
| SUBCNT VALUE | YCNTA INTEGER PART | YCNTB INTEGER PART | CCNT INTEGER PART | DEC |
| 0, 2 | (MAINCNT)-1 | MAINCNT | MAINCNT | 1 |
| 0, 2 | (MAINCNT)-1 | MAINCNT | (MAINCNT)-1 | 3 |
| 1, 3 | (MAINCNT)-1 | (MAINCNT)-1 | (MAINCNT)-1 | 2 |
| THE OTHER CASES | | | | 0 |

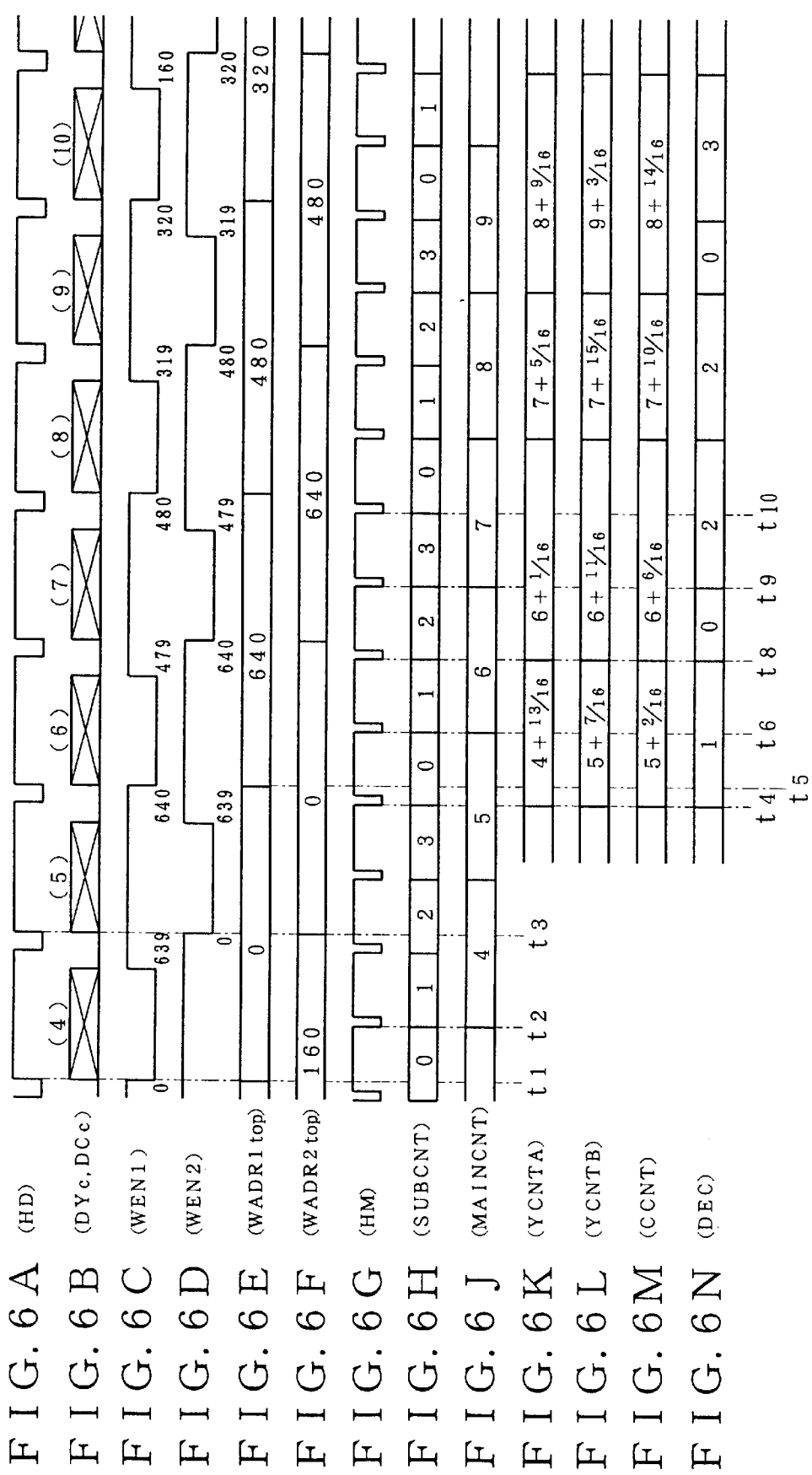

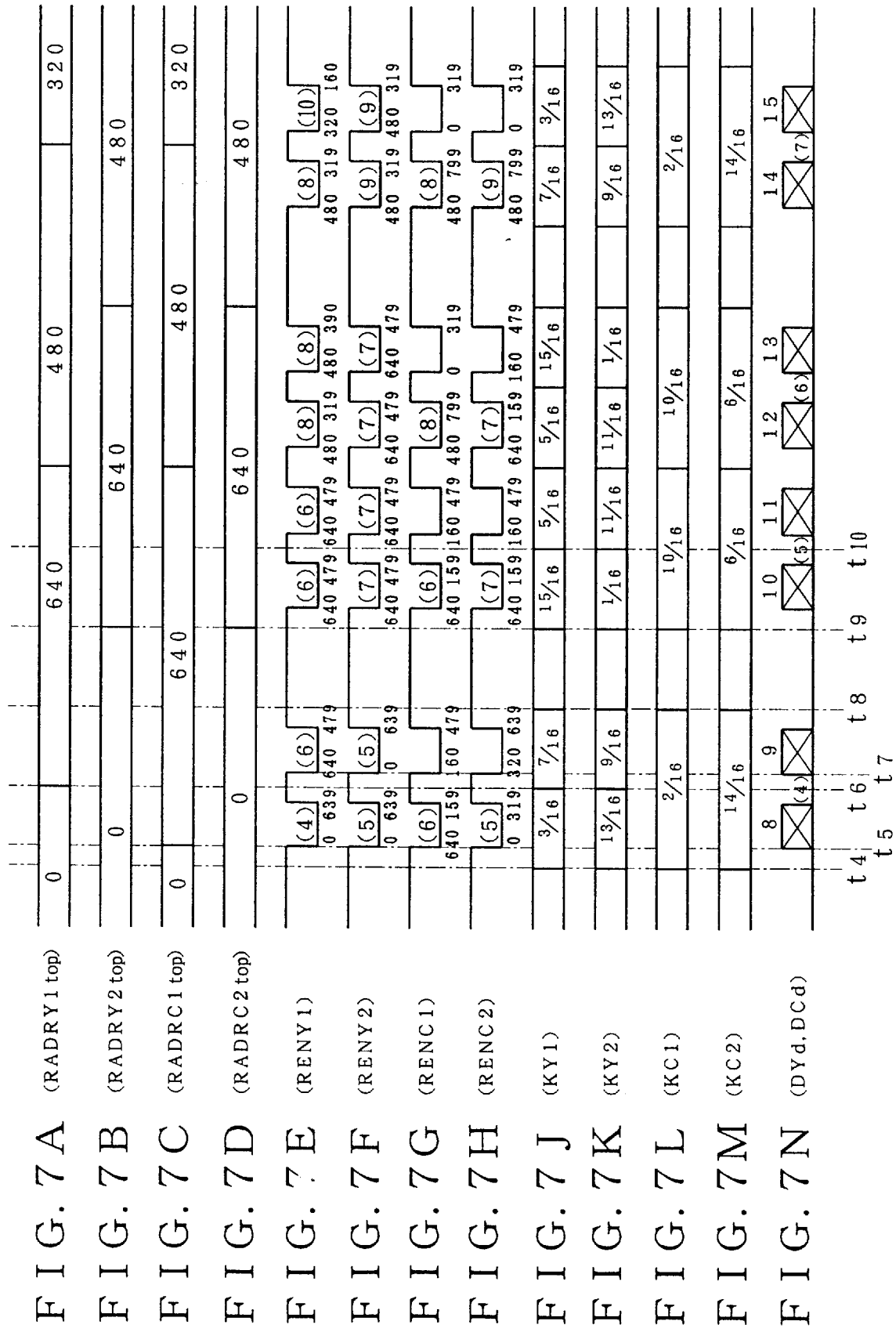

FIG. 9

| TRANSFER OPERATION | TRANSFER TIMING |
|---|---|
| WADR1top → RADRY1top (LINE MEMORY 321) | AT THE OCCASION WHEN SUBCNT IS CHANGED FROM "0" TO "1" |
| WADR2top → RADRY2top (LINE MEMORY 322) | AT THE OCCASION WHEN SUBCNT IS CHANGED FROM "2" TO "3" |
| WADR1top → RADRC1top (LINE MEMORY 341) | AT THE OCCASION WHEN SUBCNT IS CHANGED FROM "0" TO "1" AND JUST BEFORE READING FROM LINE MEMORY IS STARTED WHEN DEC=1 AND SUBCNT=0 |
| WADR2top → RADRC2top (LINE MEMORY 342) | AT THE OCCASION WHEN SUBCNT IS CHANGED FROM "2" TO "3" AND JUST BEFORE READING FROM LINE MEMORY IS STARTED WHEN DEC=1 AND SUBCNT=2 |

F I G. 10

| CONDITION | KY1 | | KY2 | |
|---|---|---|---|---|
| | FIRST LINE | SECOND LINE | FIRST LINE | SECOND LINE |
| SUBCNT=1, 2 | YCNTA DECIMAL FRACTION PART | YCNTB DECIMAL FRACTION PART | 1−(YCNTA DECIMAL FRACTION PART) | 1−(YCNTB DECIMAL FRACTION PART) |
| SUBCNT=0, 3 | 1−(YCNTA DECIMAL FRACTION PART) | 1−(YCNTB DECIMAL FRACTION PART) | YCNTA DECIMAL FRACTION PART | YCNTB DECIMAL FRACTION PART |

FIG. 11

| CONDITIONS | | KC1 | KC2 |
|---|---|---|---|
| DEC=2,3 | SUBCNT=1, 2 | CCNT DECIMAL FRACTION PART | 1−(CCNT DECIMAL FRACTION PART) |
| | SUBCNT=0, 3 | 1−(CCNT DECIMAL FRACTION PART) | CCNT DECIMAL FRACTION PART |
| DEC=1 | SUBCNT=0, 1 | CCNT DECIMAL FRACTION PART | 1−(CCNT DECIMAL FRACTION PART) |
| | SUBCNT=2, 3 | 1−(CCNT DECIMAL FRACTION PART) | CCNT DECIMAL FRACTION PART |

| INPUT | | | | OUTPUT |
|---|---|---|---|---|
| VALUE SUBCNT | YCNTA INTEGER PART | YCNTB INTEGER PART | CCNT INTEGER PART | DEC |
| 1, 5 | (MAINCNT)−1 | MAINCNT | MAINCNT | 1 |
| 1, 5 | (MAINCNT)−1 | MAINCNT | (MAINCNT)−1 | 3 |
| 0, 2, 3, 4, 6, 7 | (MAINCNT)−1 | (MAINCNT)−1 | (MAINCNT)−1 | 2 |
| THE OTHER CASES | | | | 0 |

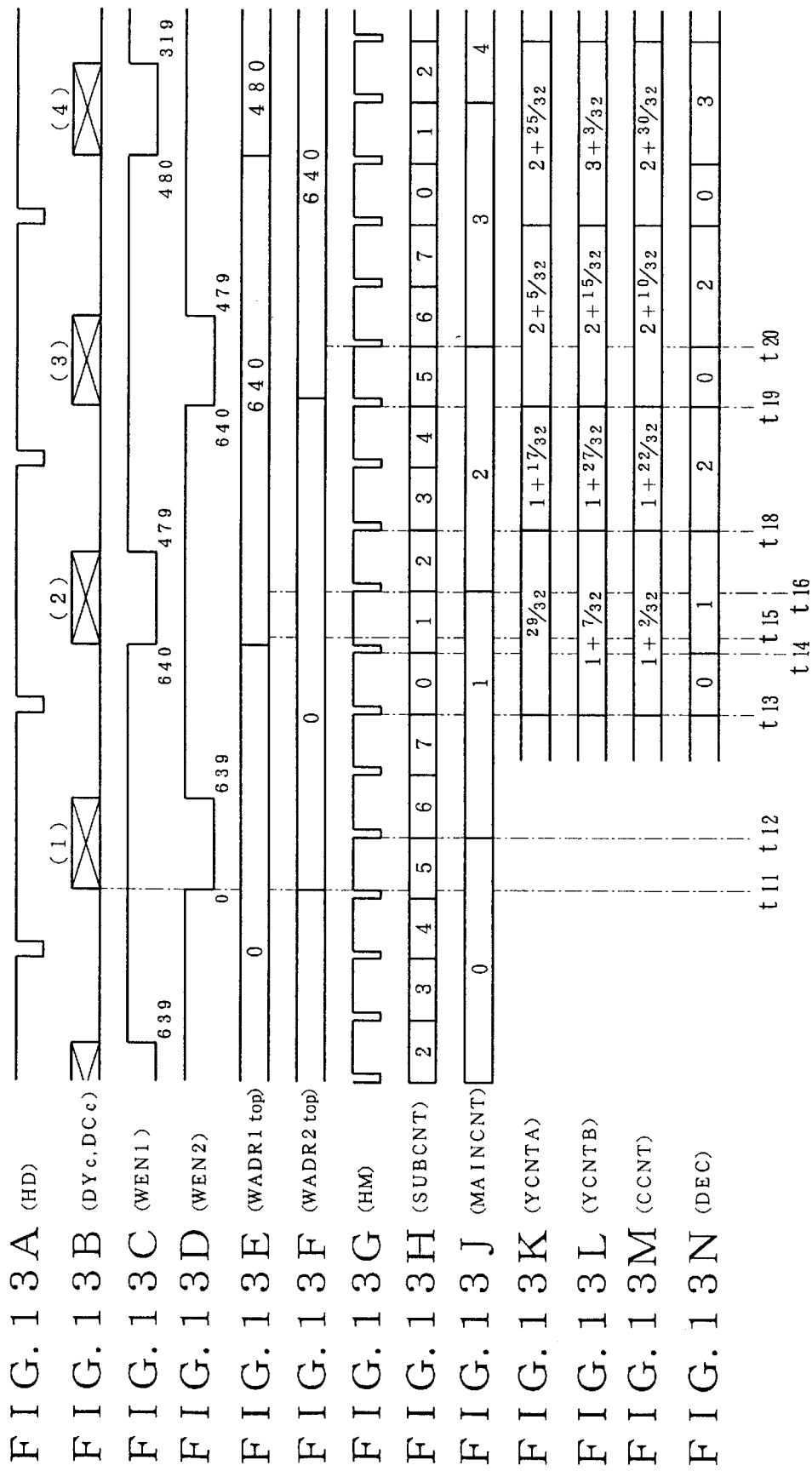

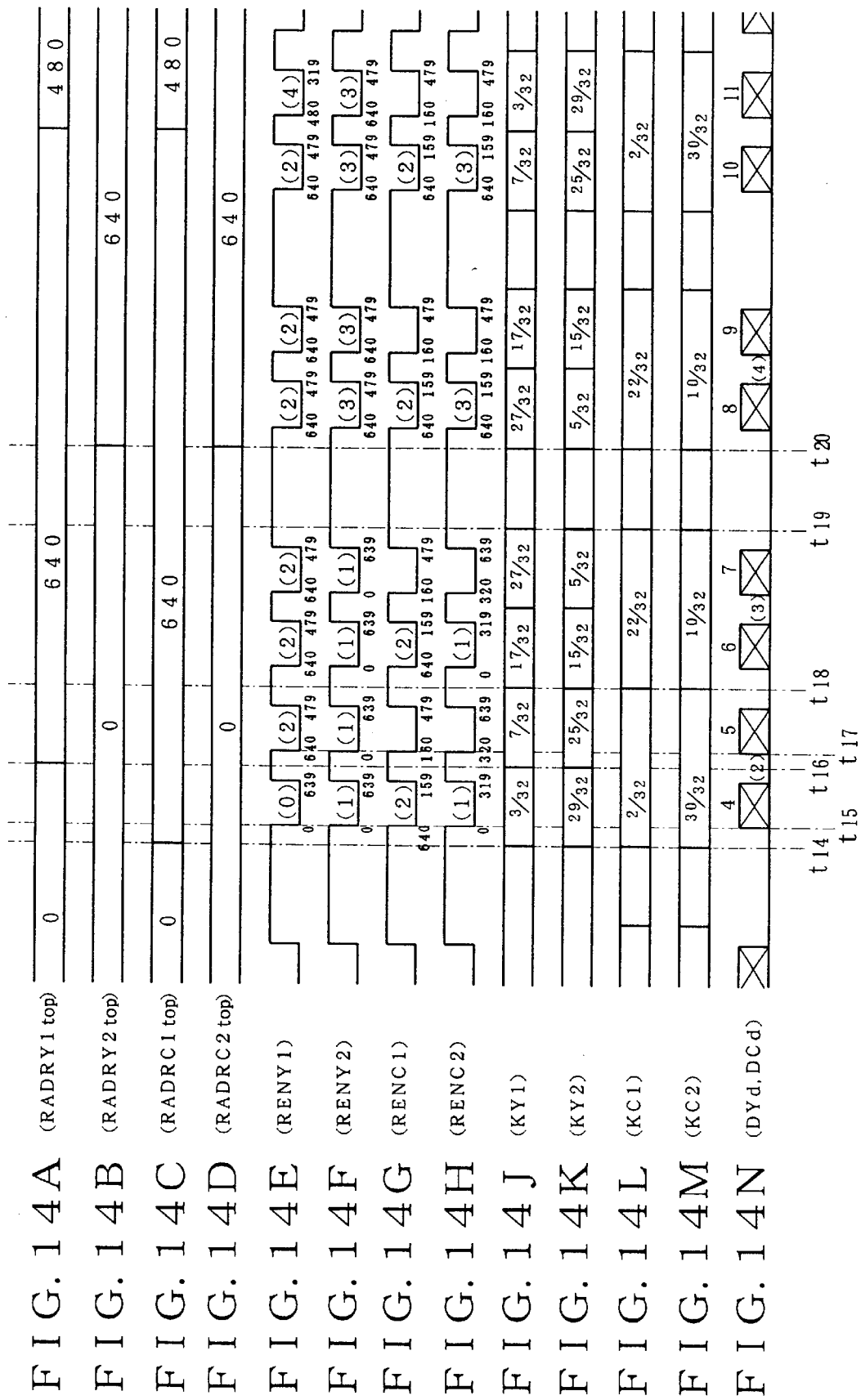

FIG. 16

| TRANSFER OPERATION | TRANSFER TIMING |
|---|---|
| WADR1top → RADRY1top (LINE MEMORY 321) | AT THE OCCASION WHEN SUBCNT IS CHANGED FROM "1" TO "2" |
| WADR2top → RADRY2top (LINE MEMORY 322) | AT THE OCCASION WHEN SUBCNT IS CHANGED FROM "5" TO "6" |
| WADR1top → RADRC1top (LINE MEMORY 341) | AT THE OCCASION WHEN SUBCNT IS CHANGED FROM "1" TO "2" AND JUST BEFORE READING FROM LINE MEMORY IS STARTED WHEN DEC=1 AND SUBCNT=1 |
| WADR2top → RADRC2top (LINE MEMORY 342) | AT THE OCCASION WHEN SUBCNT IS CHANGED FROM "5" TO "6" AND JUST BEFORE READING FROM LINE MEMORY IS STARTED WHEN DEC=1 AND SUBCNT=5 |

FIG. 17

| CONDITION | KY1 | | KY2 | |
|---|---|---|---|---|
| | FIRST LINE | SECOND LINE | FIRST LINE | SECOND LINE |
| SUBCNT = 2, 3, 4, 5 | YCNTA DECIMAL FRACTION PART | YCNTB DECIMAL FRACTION PART | 1 − (YCNTA DECIMAL FRACTION PART) | 1 − (YCNTB DECIMAL FRACTION PART) |
| SUBCNT = 0, 1, 6, 7 | 1 − (YCNTA DECIMAL FRACTION PART) | 1 − (YCNTB DECIMAL FRACTION PART) | YCNTA DECIMAL FRACTION PART | YCNTB DECIMAL FRACTION PART |

F I G. 1 8

| CONDITIONS | | KC1 | KC2 |
|---|---|---|---|
| DEC=2,3 | SUBCNT=2,3,4,5 | CCNT DECIMAL FRACTION PART | 1-(CCNT DECIMAL FRACTION PART) |
| | SUBCNT=0,1,6,7 | 1-(CCNT DECIMAL FRACTION PART) | CCNT DECIMAL FRACTION PART |
| DEC=1 | SUBCNT=1,2,3,4 | CCNT DECIMAL FRACTION PART | 1-(CCNT DECIMAL FRACTION PART) |
| | SUBCNT=0,5,6,7 | 1-(CCNT DECIMAL FRACTION PART) | CCNT DECIMAL FRACTION PART |

VIDEO SIGNAL PROCESSING CIRCUIT AND IMAGE PICKUP APPARATUS USING THE CIRCUIT

BACKGROUND OF THE INVENTION

1. Field of the Invention

The present invention relates to a video signal processing circuit and an image pickup apparatus using the circuit. More particularly, the invention relates to a video signal processing circuit and an image pickup apparatus capable of simultaneously changing the number of lines and performing format conversion of video signals by using line memories.

2. Description of Related Art

In an image pickup apparatus such as a digital still camera using a solid image pickup device such as a CCD, an image obtained by the solid image pickup device is displayed on an image display device such as a liquid crystal monitor or a view finder. A user checks an object and a composition by using the displayed image and operates a shutter when a desired image is obtained, thereby capturing the image. In this instance, a digital video signal of the captured still image is written into a recording medium such as a memory card, a magnetic disk, or an optical disk. In such a manner, the image can be acquired without using a film.

By reading the video signal recorded on the recording medium and supplying it to the display device, the obtained still image is displayed on the screen of the display or supplied to a printer or the like wherein the obtained still image is printed. Further, the read video signal is supplied to a computer wherein the obtained still image is processed or the like.

In such a digital still camera, the number of pixels of the solid image pickup device is being increased so as to acquire an image of higher picture quality. In case of using the solid image pickup device having a large number of pixels, when an image for checking the object and the composition (hereinbelow, called a "preview image") is displayed on an image display device, it takes time to read a signal since the data amount of the video signals is large. Thereby a motion in the preview image is not smooth. By reading the video signal while thinning out the lines of the solid image pickup device, reduction in the frame rate is prevented.

Since the video signals are read while thinning out the lines, however, a process for changing the image size is performed to display the preview image at a normal aspect ratio.

For example, when images of 30 frames are obtained per second by using a solid image pickup device of 640×480 pixels, images of 7.5 frames are obtained per second if a solid image pickup device of 1280×960 pixels is used and the video signal is read at the same speed as that of the solid image pickup device of 640×480 pixels. Thereby the motion is not smooth. By reading the video signals while thinning out the lines of the solid image pickup device to ¼, video signals of an amount corresponding to 30 frames per second can be obtained. Since the video signals of the amount corresponding to 30 frames per second are obtained while thinning out the lines to ¼, however, in order to display the preview image at a normal aspect ratio, a process to reduce the image to the half in the horizontal direction and enlarge the image so as to be doubled in the vertical direction is performed.

The process of changing the image size in the vertical direction, that is, the process of changing the number of line is performed by linear interpolation. In the process of changing the number of lines, a process of storing the video signal into a frame memory and changing the number of lines to a desired magnification by using the video signal stored in the frame memory is performed.

By using the frame memory, however, the cost becomes high and it is necessary to assure an area in a substrate to mount the frame memory, so that the miniaturization is hindered. Further, when a frame memory is used for another signal process, the frame memory is shared and it is also used for changing the number of lines, it takes time for the process and the processing speed of the whole system is reduced.

SUMMARY OF THE INVENTION

It is an object of the invention to provide a video signal processing circuit capable of easily changing the number of lines with a simple construction at low cost and simultaneously performing a signal format conversion in a real-time manner, and an image pickup apparatus using the circuit.

In carrying out the invention in one preferred mode, I provide a video signal processing circuit comprising first and second line memories for storing an inputted luminance signal, each having a memory capacity larger than a data amount of one line of the luminance signals, and third and fourth line memories for storing an inputted color difference signal, each having a memory capacity larger than a data amount of one line of the color difference signals. Further, the video signal processing circuit comprises first count means for indicating a space line position of each of the luminance signal and the color difference signal to be written in the first to fourth line memories, second count means for indicating a space line position of a luminance signal to be outputted, and third count means for indicating a space line position of a color difference signal to be outputted. The video signal processing circuit also comprises writing and reading means for alternately writing the inputted luminance signal into the first and second line memories every line in a ring method, alternately writing the inputted color difference signal every line into the third and fourth line memories in a ring method, determining a read start position and a read start timing of each of the luminance signals written in the first and second line memories and the color difference signals written in the third and fourth line memories by using integer parts of the first to third count means, and reading the written luminance and color difference signals, and coefficient generating means for generating first to fourth coefficients by using decimal fraction parts of the second and third count means. The video signal processing circuit also comprises a first multiplier for multiplying the luminance signal read from the first line memory by the signal writing and reading means by the first coefficient generated by the coefficient generating means, a second multiplier for multiplying the luminance signal read from the second line memory by the signal writing and reading means by the second coefficient generated by the coefficient generating means, a third multiplier for multiplying the color difference signal read from the third line memory by the signal writing and reading means by the third coefficient generated by the coefficient generating means, a fourth multiplier for multiplying the color difference signal read from the fourth line memory by the signal writing and reading means by the fourth coefficient generated by the coefficient generating means, a first adder for adding outputs of the first and second multipliers to generate a luminance signal whose space line position is shown by the second count means, and outputting the luminance signal, and a second adder for adding outputs of the third and fourth multipliers to generate a color difference signal whose space line position is shown by the third count means, and outputting the color difference signal.

As another preferred mode, I provide an image pickup apparatus comprising image pickup means for obtaining a luminance signal and a color difference signal of an obtained image, first and second line memories for storing the luminance signal obtained by the image pickup means, each having a memory capacity larger than a data amount of one line of the luminance signals, and third and fourth line memories for storing the color difference signal obtained by the image pickup means, each having a memory capacity larger than a data amount of one line of the color difference signals. Further, the image pickup apparatus comprises first count means for indicating a space line position of each of the luminance signal and the color difference signal which are written in the first to fourth line memories, second count means for indicating a space line position of a luminance signal to be outputted, third count means for indicating a space line position of a color difference signal to be outputted. The image pickup apparatus also comprises writing and reading means for alternately writing the inputted luminance signal into the first and second line memories every line in a ring method, alternately writing the inputted color difference signal every line into the third and fourth line memories in a ring method, determining a read start position and a read start timing of each of the luminance signals written in the first and second line memories and the color difference signals written in the third and fourth line memories by using integer parts of the first to third count means, and reading the written luminance and color difference signals, and coefficient generating means for generating first to fourth coefficients by using decimal fraction parts of the second and third count means. The image pickup apparatus comprises a first multiplier for multiplying the luminance signal read from the first line memory by the signal writing and reading means by the first coefficient generated by the coefficient generating means, a second multiplier for multiplying the luminance signal read from the second line memory by the signal writing and reading means by the second coefficient generated by the coefficient generating means, a third multiplier for multiplying the color difference signal read from the third line memory by the signal writing and reading means by the third coefficient generated by the coefficient generating means, a fourth multiplier for multiplying the color difference signal read from the fourth line memory by the signal writing and reading means by the fourth coefficient generated by the coefficient generating means, a first adder for adding outputs of the first and second multipliers to generate a luminance signal whose space line position is shown by the second count means, and outputting the luminance signal, and a second adder for adding outputs of the third and fourth multipliers to generate a color difference signal whose space line position is shown by the third count means, and outputting the color difference signal.

In the invention, the luminance signal is written alternately to the first and second line memories and the color difference signal is written alternately to the third and fourth line memories. During a period of writing the luminance signal of one line or the color difference signal of one line, for example, the luminance signals of one line written in the first and second line memories are read a plurality of times and the color difference signals of one line written in the third and fourth line memories are read only by the number of times which is the half of the number of times of reading the luminance signal. The reading start position and reading start timing of each of the luminance signals written in the first and second line memories and the color difference signals written in the third and fourth line memories are determined by using the integer parts of the first to third count means.

First to fourth coefficients are generated by the coefficient generating means by using decimal fraction parts of the second count means for showing the space line position of a luminance signal to be outputted and the decimal fraction parts of the third count means for showing the space line position of a color difference signal to be outputted. The luminance signal read from the first line memory is multiplied by the first coefficient, the luminance signal read from the second line memory is multiplied by the second coefficient. The two luminance signals multiplied by the coefficients are added, thereby generating a new luminance signal by linear interpolation. The count step amount of each of the second and third count means is varied and the number of lines of luminance signals to be generated is varied according to the count step amount.

Further, during a period in which luminance signals of one line are read twice from the first and second line memories, the color difference signals of one line are read once from the third and fourth line memories. The color difference signal read from the third line memory is multiplied by the third coefficient and the color difference signal read from the fourth line memory is multiplied by the fourth coefficient. The two color difference signals multiplied by the coefficients are added, thereby simultaneously generating new color difference signals of one line per new luminance signals of two lines.

A further understanding of the nature and advantages of the invention may be realized by reference to the following portions of the specification and drawings.

BRIEF DESCRIPTION OF THE DRAWINGS

FIGS. 6A to 6N are diagrams (part 1) for explaining an operation executed when a format conversion is performed by increasing the number of lines by "8/5" times;

FIGS. 7A to 7N are diagrams (part 2) for explaining the operation executed when the format conversion is performed by increasing the number of lines by "8/5" times;

FIG. 9 is a diagram for explaining an operation of a head address transfer control circuit executed when a format conversion is performed by increasing the number of lines by "8/5" times;

FIG. 10 is a diagram for explaining an operation of a coefficient generating circuit executed when a format conversion is performed by increasing the number of lines by "8/5" times;

FIG. 11 is a diagram for explaining an operation of a coefficient generating circuit executed when a format conversion is performed by increasing the number of lines by "8/5" times;

FIGS. 13A to 13N are diagrams (part 1) for explaining an operation executed when a format conversion is performed by increasing the number of lines by "16/5" times;

FIGS. 14A to 14N are diagrams (part 2) for explaining the operation executed when the format conversion is performed by increasing the number of lines by "16/5" times;

FIG. 16 is a diagram for explaining an operation of a head address transfer control circuit executed when the format conversion is performed by increasing the number of lines by "16/5" times;

FIG. 17 is a diagram for explaining an operation of a coefficient generating circuit executed when the format conversion is performed by increasing the number of lines by "16/5" times; and FIG. 18 is a diagram for explaining an operation of a coefficient generating circuit executed when the format conversion is performed by increasing the number of lines by "16/5", times.

DETAILED DESCRIPTION OF THE INVENTION

Figure 1:
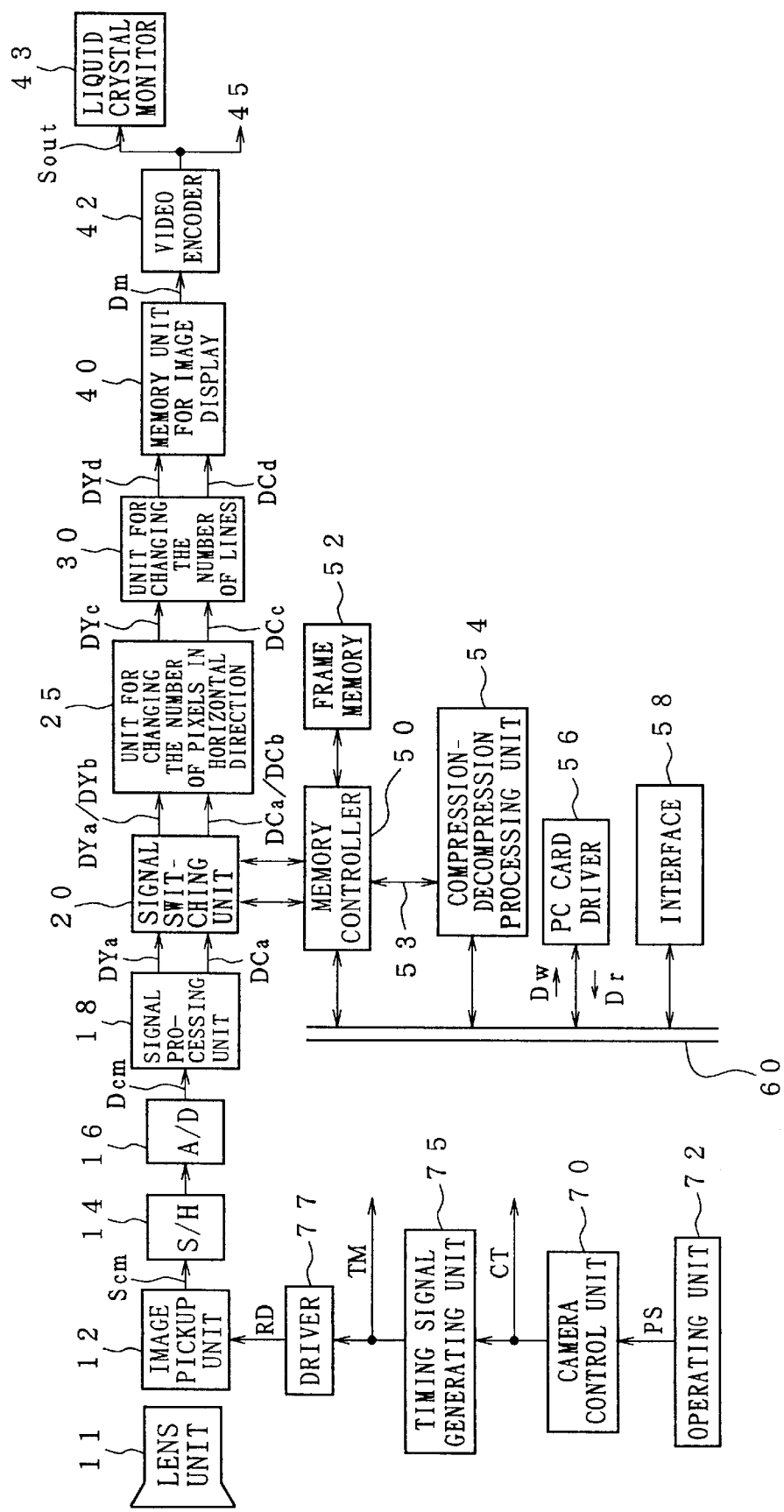
FIG. 1 is a diagram showing the construction of a digital still camera using a video signal processing circuit and an image pickup apparatus as an embodiment of the invention.

Embodiments of the invention will now be described in detail hereinbelow with reference to the drawings. FIG. 1 shows the whole construction of an image pickup apparatus, for example, a digital still camera.

Object light is supplied via a lens unit 11 to an image pickup unit 12 constructed by using a solid image pickup device such as a CCD as a photoelectric converting device. The image pickup unit 12 generates an image pickup signal Scm based on the object light. After noise components are eliminated by a sample-and-hold unit 14, the image pickup signal Scm is converted into a digital video signal Dcm by an A/D converting unit 16 and the video signal Dcm is supplied to a signal processing unit 18.

The signal processing unit 18 performs a gamma process, a white balance adjustment, an outline correcting process, and the like on the video signal Dcm. Further, the signal processing unit 18 generates a luminance signal DYa and a color difference signal DCb in a 4:2:2 format (format in which the data amount of each of the color difference signals Cr and Cb is reduced to the half of a luminance signal Y in the lateral direction) from the video signal Dcm by a matrix process and transmits them to a signal switching unit 20.

The signal switching unit 20 receives the luminance signal DYa and the color difference signal DCa from the signal processing unit 18 and supplies them to a unit 25 for changing the number of pixels in the horizontal direction or a memory controller 50, which will be described hereinafter. The signal switching unit 20 also receives a luminance signal DYb and a color difference signal DCb from the memory controller 50 and supplies them to the unit 25 for changing the number of pixels in the horizontal direction.

The unit 25 for changing the number of pixels in the horizontal direction performs a converting process by linear interpolation using a register or the like so that the number of pixels in the horizontal direction of each of the luminance signals DYa and DYb and the color difference signals DCa and DCb from the signal switching unit 20 becomes the number of pixels in the horizontal direction adapted to a video encoder 42, which will be described hereinafter. The unit 25 supplies the luminance signal DYc and the color difference signal DCc obtained by the process of changing the number of pixels in the horizontal direction to a unit 30 for changing the number of lines.

The unit 30 for changing the number of lines changes the number of lines of the luminance signal DYc and the color difference signal DCc into a luminance signal DYd and a color difference signal DCd adapted to the video encoder 42. Each of the luminance signal DYd and the color difference signal DCd has a number of lines adapted to the video encoder 42 and a format adapted to the video encoder 42 such as a 4:2:0 format (format in which the data amount of each of the color difference signals Cr and Cb is reduced in both of the vertical and lateral directions to the half of that of the luminance signal Y). The unit 30 transmits such the luminance signal DYd and the color difference signal DCd obtained by the changing process thereof to a memory unit 40 for an image display and then the memory unit 40 stores them. The memory unit 40 transmits a video signal Dm read therefrom to the video encoder 42.

The video encoder 42 generates a video signal Sout in the NTSC or PAL system by using the video signal Dm supplied from the memory unit 40 for image display and supplies it to a liquid crystal monitor 43 or an external monitor apparatus 45.

The memory controller 50 controls the signal switching unit 20 so that the luminance signal DYa and the color difference signal DCa supplied from the signal processing unit 18 are written to a frame memory 52. The memory controller 50 reads the luminance signal DYb and the color difference signal DCb from the frame memory 52. The memory controller 50 also supplies them to the unit 25 for changing the number of pixels in the horizontal direction via the signal switching unit 20, and supplies them to a compression-decompression processing unit 54 via a dedicated bus 53.

The compression-decompression processing unit 54 performs a compressing process according to, for example, JPEG (Joint Photographic Experts Group) system, on the luminance signal DYb and the color difference signal DCb supplied via the dedicated bus 53. The signal obtained by the compressing process is added with header information or the like and supplied as a recording video signal Dw to a PC card driver 56 via a data bus 60. The compression-decompression processing unit 54 also executes a decompressing process of the compression processed signal.

The PC card driver 56 records the supplied recording video signal Dw to a PC card. The PC card driver 56 reads video signal Dr from the PC card. When the video signal Dr read from the PC card is compressed, the read video signal Dr is supplied to the compression-decompression processing unit 54 wherein the video signal Dr is subjected to the decompression process. The luminance signal and the color difference signal obtained by the decompression process are supplied to the unit 25 for changing the number of pixels in the horizontal direction via the memory controller 50 and the signal switching unit 20.

An interface unit 58 is connected to the data bus 60 and the video signal can be transferred to/from an external apparatus via the interface unit 58.

A camera control unit 70 takes the form of a microcomputer or the like. To the camera control unit 70, an operating unit 72 is connected. The camera control unit 70 generates a control signal CT for performing operations according to the instruction of the operating unit 72 on the basis of an operation signal PS from the operating unit 72, supplies the control signal CT to various units and controls the operations.

A timing signal generating unit 75 generates timing signals TM having a clock signal, a horizontal pulse signal HD, a vertical pulse signal VD, and the like on the basis of the control signal CT from the camera control unit 70 and supplies the signal TM to respective units. A driver 77 generates a drive signal RD for driving the solid image pickup device on the basis of the timing signal TM and supplies the signal RD to the image pickup unit 12.

In a digital still camera 10 constructed in such a manner, before capturing a still image by photographing the object, the luminance signal DYa and the color difference signal DCa from the signal processing unit 18 are supplied through the signal switching unit 20 to the unit 25 for changing the number of pixels in the horizontal direction. Thus, a preview image for checking the object and composition is displayed on the screen of the liquid crystal monitor 43 or the external monitor apparatus 45.

When a desired image is displayed on the screen of the liquid crystal monitor 43 or the external monitor apparatus 45 and the user operates the shutter of the operating unit 72, the luminance signal DYa and the color difference signal DCa from the signal processing unit 18 are supplied to the memory controller 50 through the signal switching unit 20. The signal switching unit 20 writes the luminance signal DYa and the color difference signal DCa in the frame memory 52 at the timing when the shutter is operated. The luminance signal DYa and the color difference signal DCa written in the frame memory 52 are compressed by the compression-decompression processing unit 54 and then the compressed signals are supplied to the PC card driver 56, thereby enabling a desired still image to be recorded in the PC card.

In case of checking an image written in the PC card, the luminance signal DYb and the color difference signal DCb based on the video signal read from a PC card K are supplied from the memory controller 50 via the signal switching unit 20 to the unit 25 for changing the number of pixels in the horizontal direction, thereby enabling the image written in the PC card to be displayed on the screen of the liquid crystal monitor 43 or the external monitor apparatus 45.

In this embodiment, the solid image pickup device having a large number of pixels is used in order to obtain a high-resolution image. Therefore, the unit 25 for changing the number of pixels in the horizontal direction and the unit 30 for changing the number of lines carry out the process of changing the number of pixels in the horizontal direction and the number of lines to generate the video signal Sout in the NTSC or PAL system in the video encoder 42 and display the obtained image on the liquid crystal monitor 43 or the external monitor apparatus 45.

The unit 25 for changing the number of pixels in the horizontal direction performs a process of changing the number of pixels in the horizontal direction by linear interpolation by using, for example, a register or the like. The unit 30 for changing the number of lines performs the process of changing the number of lines by using the line memories. When the unit 30 receives the luminance and color difference signals in the 4:2:2 format, the unit 30 also executes a process of converting the signals into those in the 4:2:0 format.

Figure 2:
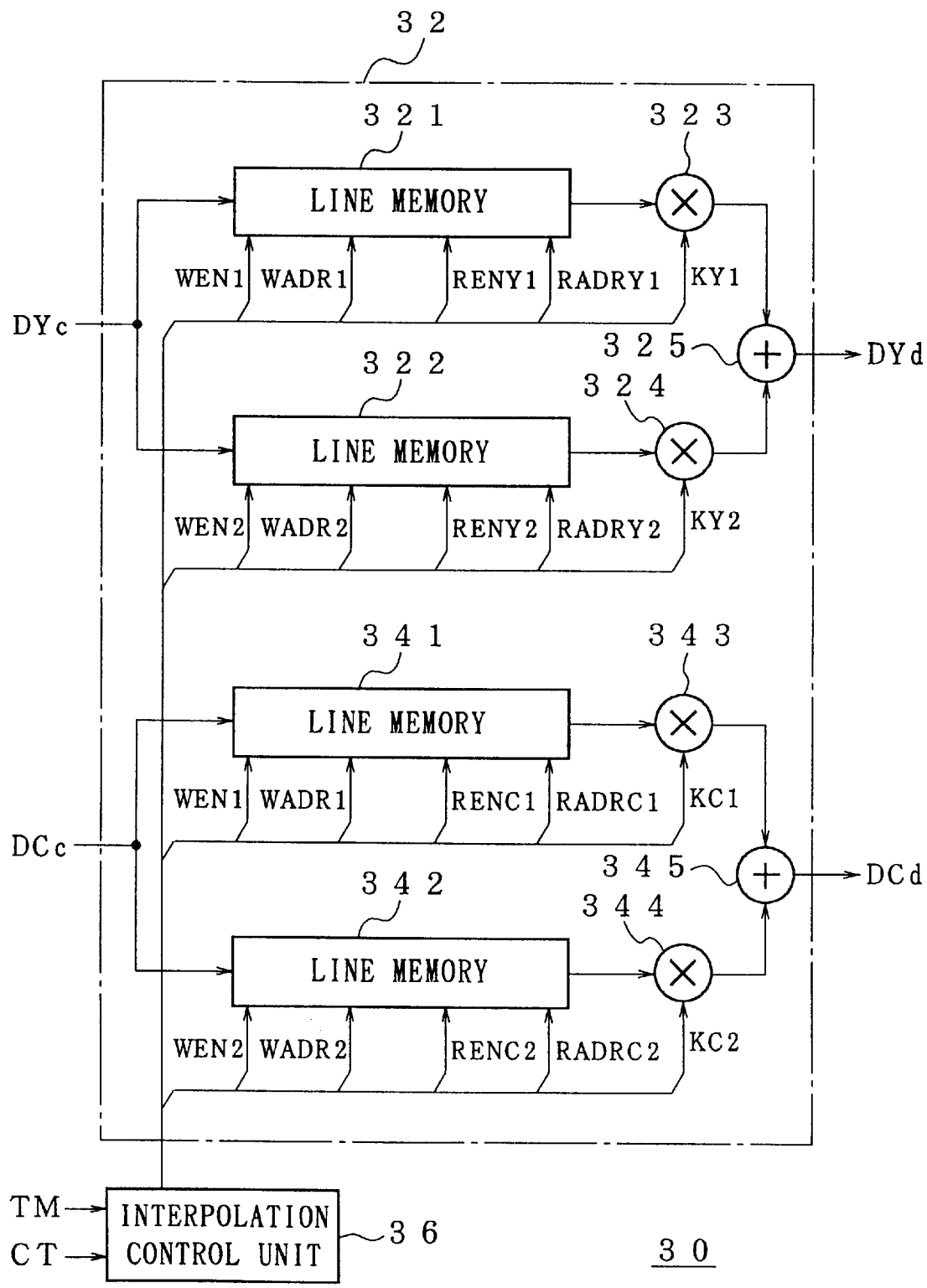
FIG. 2 is a diagram showing the construction of a unit for changing the number of lines.

FIG. 2 shows the construction of the unit 30 for changing the number of lines. The unit 30 for changing the number of lines comprises a linear interpolating unit 32 including line memories and an interpolation control unit 36.

The linear interpolating unit 32 has two dual port line memories (hereinbelow, called "line memories") 321 and 322, two multipliers 323 and 324, and an adder 325 for carrying out the process of converting the luminance signal DYc. The linear interpolating unit 32 also has two line memories 341 and 342, two multipliers 343 and 344, and an adder 345 for performing the process of converting the color difference signal DCc.

The memory capacity of the line memories 321, 322, 341, and 342 are equal to each other and each capacity is larger than the data amount of each of the luminance signal DYc of one line and the color difference signal DCc of one line.

In the line memories 321, 322, 341, and 342, the luminance signal DYc and the color difference signal DCc are enabled to be written by write enable signals WEN1 and WEN2 supplied from the interpolation control unit 36, which will be described hereinafter. The luminance signal DYc and the color difference signal DCc are written in a ring method on the basis of write address signals WADR1 and WADR2. To be specific, signals are sequentially written from the head position of each of the line memories to the end position and again from the head position.

The luminance signal DYc written is enabled to be read by luminance read enable signals RENY1 and RENY2 and is read on the basis of luminance read address signals RADRY1 and RADRY2. The color difference signal DCc written is also enabled to be read by color difference read enable signals RENC1 and RENC2 and is read on the basis of color difference read address signals RADRC1 and RADRC2.

The luminance signal read from the line memory 321 is supplied to the multiplier 323. In the multiplier 323, the luminance signal supplied from the line memory 321 is multiplied by a luminance signal coefficient KY1 supplied from the interpolation control unit 36. The multiplier 323 supplies a resultant signal to the adder 325.

The luminance signal read from the line memory 322 is supplied to the multiplier 324. In the multiplier 324, the luminance signal read from the line memory 322 is multiplied by a luminance signal coefficient KY2 supplied from the interpolation control unit 36. The multiplier 324 supplies a resultant signal to the adder 325.

The adder 325 adds the luminance signal supplied from the multiplier 323 and the luminance signal supplied from the multiplier 324. The adder 325 outputs a resultant as a luminance signal DYd.

Similarly, the color difference signal read from the line memory 341 is supplied to the multiplier 343. In the multiplier 343, the luminance signal supplied from the line memory 341 is multiplied by a color difference coefficient KC1 supplied from the interpolation control unit 36. The multiplier 343 supplies a resultant signal to the adder 345.

The color difference signal read from the line memory 342 is supplied to the multiplier 344. In the multiplier 344, the color difference signal read from the line memory 342 is multiplied by a color difference signal coefficient KC2 supplied from the interpolation control unit 36. The multiplier 344 supplies a resultant signal to the adder 345.

The adder 345 adds the color difference signal supplied from the multiplier 343 and the color difference signal supplied from the multiplier 344. The adder 345 outputs a resultant as a color difference signal DCd.

Figure 3:
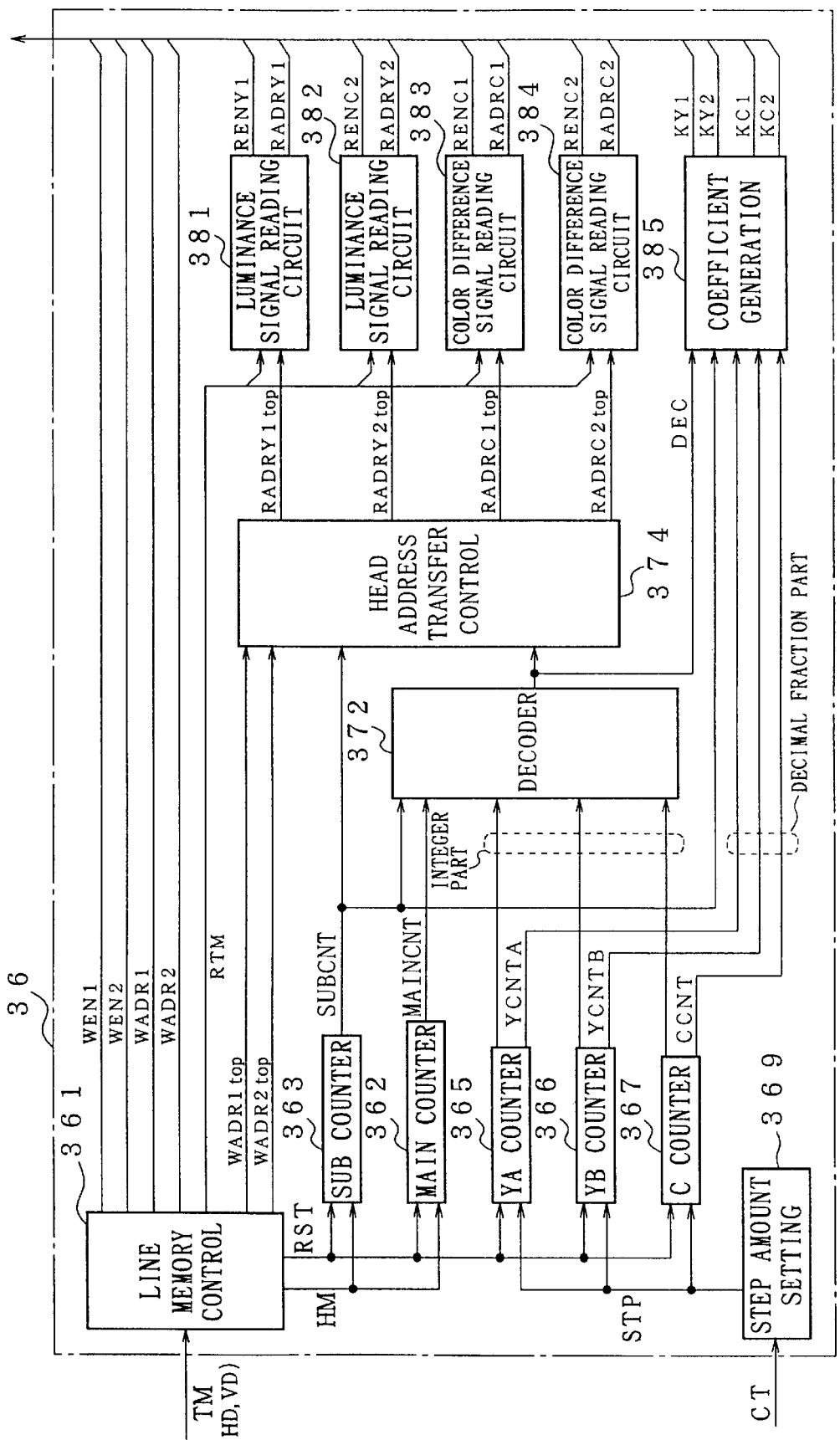
FIG. 3 is a diagram showing the construction of an interpolation control unit.

As shown in FIG. 3, the interpolation control unit 36 has a line memory control circuit 361. The line memory control circuit 361 serving as writing and reading means generates the write enable signals WEN1 and WEN2 which enable the luminance signal DYc to be written into the line memories 321 and 322 and the color difference signal DCc to be written into the line memories 341 and 342, respectively, based on the timing signal TM supplied from the timing signal generating unit 75. The line memory control circuit 361 also generates the write address signals WADR1 and WADR2 indicative of the writing positions of the luminance signal DYc and the color difference signal DCc.

Further, the line memory control circuit 361 generates write start address signals WADR1top and WADR2top indicative of the write start positions of the luminance signal DYc of one line and the color difference signal DCc of one line. The generated write enable signal WEN1 and the generated write address signal WADR1 are supplied to the line memories 321 and 341 in the linear interpolating unit 32. The generated write enable signal WEN2 and the generated write address signal WADR2 are supplied to the line memories 322 and 342 in the linear interpolating unit 32. The write start address signals WADR1top and WADR2top are supplied to a head address. transfer control circuit 374.

The line memory control circuit 361 generates a pulse signal HM, which is synchronous with the horizontal pulse signal HD of the timing signal TM on the basis of the horizontal pulse signal HD. The pulse signal HM has a frequency which is predetermined times as high as that of the horizontal pulse signal HD.

The line memory control circuit 361 also generates a reset signal RST synchronized with a vertical pulse signal VD in the timing signal TM. The pulse signal HM is supplied to a MAIN counter 362 and a SUB counter 363, which will be described herein later. The reset signal RST is supplied to the MAIN counter 362, the SUB counter 363, a YA counter 365, a YB counter 366, and a C counter 367.

The writing and reading means comprises the line memory control circuit 361, the SUB counter 363, a decoder 372, the head address transfer control circuit 374, luminance signal reading circuits 381 and 382, and color difference signal reading circuits 383 and 384.

The interpolation control unit 36 has five counters of the MAIN counter 362, SUB counter 363, YA counter 365, YB counter 366, and C counter 367.

The MAIN counter 362 as first counting means counts the number of lines of the luminance signals DYc and the color difference signals DCc transmitted to the linear interpolating unit 32. A count value MAINCNT of the MAIN counter 362 increases by "1" each time the luminance signals DYc of one line and the color difference signals DCc of one line are transmitted to the linear interpolating unit 32. From the count value MAINCNT, therefore, the space position of each of the luminance signal DYc and the color difference signal DCc transmitted to the linear interpolating unit 32 can be determined.

The YA counter 365 and the YB counter 366 as second counting means sequentially add a step amount set according to the change in the number of lines with respect to a predetermined reference value, thereby showing the space position of the luminance signal DYd generated by the process of changing the number of lines by using a count value YCNTA of the YA counter 365 and a count value YCNTB of the YB counter 366.

Each of the count values YCNTA and YCNTB is made up of an integer part and a decimal fraction part. The space position of the luminance signal DYc is indicated by the integer part and the distance from the space position of the luminance signal DYc is shown by the decimal fraction part. After the generated luminance signal DYd is outputted from the linear interpolating unit 32, the YA counter 365 or the YB counter 366 adds the step amount set according to the change in the number of lines to their count value at a predetermined timing, thereby updating the count value.

The C counter 367 as third counting means sequentially adds a step amount set according to the change in the number of lines with respect to the preset reference value. Thus, the C counter 367 shows the space position information of the color difference signal DCd generated by the process of changing the number of lines by the count value CCNT of the C counter 367. The count value CCNT is made up of an integer part and a decimal fraction part. The space position of the color difference signal DCc is indicated by the integer part and the distance from the space position of the color difference signal DCc is shown by the decimal fraction part. After the generated color difference signal DCd is outputted from the linear interpolating unit 32, the C counter 367 adds the step amount set according to the change in the number of lines to its count value at a predetermined timing, thereby updating the count value thereof.

The unit 30 for changing the number of lines outputs the luminance signals DYd of two lines and outputs the color difference signals DCd of one line with respect to the luminance signals DYd of two lines, thereby performing the conversion to the 4:2:0 format. For example, the space position of the luminance signal DYd in the first line is shown by the count value YCNTA of the YA counter 365. The space position in the luminance signal DYd of the second line is shown by the count value YCNTB of the YB counter 366. The space position of the color difference signal DCd is shown by the count value CCNT of the C counter 367.

The step amounts of the count values YCNTA, YCNTB and CCNT are set according to the change in the number of lines on the basis of a step setting signal STP from a step amount setting circuit 369. The step amount setting circuit 369 generates the step setting signal STP based on the change in the number of lines set by the operating unit 72 according to the control signal CT from the camera control unit 70.

The SUB counter 363 takes an N-ary counter set according to the change in the number of lines and a count value SUBCNT thereof has only an integer part.

Figures 4, 8:
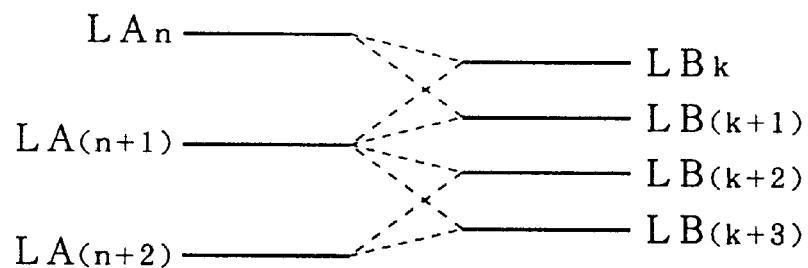
FIG. 4 is a diagram for explaining a linear interpolating operation.
FIG. 8 is a diagram for explaining an operation of a decoder executed when the format conversion is performed by increasing the number of lines by "8/5" times.

When the multiple of the number of lines is twice, for example, a signal in the LAn line shown in FIG. 4 is written in one of the two line memories and a signal in the LA(n+1) line is stored into the other line memory.

The signals in the LAn and LA(n+1) lines written in the line memories are read and a signal in the LBk line is generated. The signals in the LAn and the LA (n+1) lines written in the line memory are read again and then a signal in the LB (k+1) line is generated.

The signals in the LAn line and the LA(n+1) line have to be read before signals in the next LA(n+2) line and next LA (n+3) line are written. That is, since the signal reading operation is performed twice in the period until the signal in one of the line memories is updated, the signal reading operation is performed four times during the period until the signals in the two line memories are updated. The SUB counter 363 therefore takes the form of a quadruple counter.

When the multiple of the change in the number of lines is four times as well, similarly, the signal reading operation is executed eight times during the period until the signals in the two line memories are updated, so that the SUB counter 363 takes the form of an octal counter.

When the increase in the number of lines is smaller than double, by performing the signal reading operation four times during the period that the signals are recorded in the two line memories, the desired number of lines of signals can be generated. Therefore, the SUB counter 363 takes the form of a quadruple counter.

When the increase in the number of lines is larger than double and is equal to or smaller than four times, by performing the signal reading operation eight times during the period that the signals are recorded in the two line memories, the desired number of lines of signals can be generated, so that the SUB counter 363 takes the form of an octal counter.

The integer part of the count value of each of the MAIN counter 362, SUB counter 363, YA counter 365, YB counter 366, and C counter 367 is supplied to the decoder 372. The decimal fraction part of the counter value of each of the YA counter 365, YB counter 366, and C counter 367 is supplied to a coefficient generating circuit 385. The integer part of the count value SUBCNT of the SUB counter 363 is supplied to the head address transfer control circuit 374 and a coefficient generating circuit 385. When the change in the number of lines of the signals of one screen is finished by the reset signal RST from the line memory control circuit 361, the count value of each counter is initialized.

On the basis of the integer part of the count value of each of the SUB counter 363, YA counter 365, YB counter 366, and C counter 367, the decoder 372 generates a decoding signal DEC. The decoding signal DEC shows space positions of the luminance signals DYc and the color difference signals DCc by which the luminance signals DYd of two lines and the color difference signals DCd of one line are generated after the conversion of the number of lines. The decoding signal DEC also controls the reading of the luminance signal DYc from the line memories 321 and 322 and the reading of the color difference signal DCc from the line memories 341 and 342.

The decoder 372 supplies the decoding signal DEC to the head address transfer control circuit 374 and the coefficient generating circuit 385.

The head address transfer control circuit 374 generates the luminance read start address signals RADRY1top and RADRY2top indicative of read start positions when the luminance signal DYc is read from the line memories 321 and 322 by using the supplied write start address signals WADR1top and WARD2top on the basis of the count value SUBCNT of the SUB counter 363 and the decoding signal DEC received from the decoder 372. The head address transfer control circuit 374 also generates the color difference read start address signals RADRC1top and RADRC2top indicative of the read start positions when the color difference signal DCc is read from the line memories 341 and 342.

The luminance read start address signal RADRY1top is supplied to the luminance signal reading circuit 381 and the luminance read start address signal RADRY2top is supplied to the luminance signal reading circuit 382. The color difference read start address signal RADRC1top is supplied to the color difference signal reading circuit 383 and the color difference read start address signal RADRC2top is supplied to the color difference signal reading circuit 384.

The luminance signal reading circuit 381 generates the luminance read enable signal RENY1 which enables the luminance signal to be read from the line memory 321 and the luminance read address signal RADRY1 for reading the luminance signal from the position indicated by the luminance read start address signal RADRY1top in response to the timing signal RTM received from the line memory control circuit 361. The generated luminance read enables signal RENY1 and the generated luminance read address signal RADRY1 are supplied to the line memory 321.

Similarly, the luminance signal reading circuit 382 generates the luminance read enable signal RENY2 which enables the luminance signal to be read from the line memory 322 and the luminance read address signal RADRY2 for reading the luminance signal from the position indicated by the luminance read start address signal RADRY2top, and supplies them to the line memory 322.

The color difference signal reading circuits 383 and 384 also generate the color difference read enable signals RENC1 and RENC2 which enable the color difference signals to be read from the line memories 341 and 342 and the color difference read address signals RADRC1 and RADRC2 for reading the color difference signals from the positions indicated by the color difference read start address signals RADRC1top and RADRC2top, and supply them to the line memories 341 and 342, respectively.

The coefficient generating circuit 385 generates luminance signal coefficients KY1 and KY2 by using the decimal fraction part of the count value of each of the YA counter 365 and the YB counter 366 on the basis of the count value SUBCNT of the SUB counter 363 and the decoding signal DEC from the decoder 372.

The coefficient generating circuit 385 also generates the color difference signal coefficients KC1 and KC2 by using the decimal fraction part of the count value CCNT of the C counter 367 on the basis of the count value SUBCNT of the SUB counter 363 and the decoding signal DEC from the decoder 372.

The luminance signal coefficient KY1 thus generated is supplied to the multiplier 323. The luminance signal coefficient KY2 is supplied to the multiplier 324. The color difference signal coefficient KC1 is supplied to the multiplier 343. The color difference signal coefficient KC2 is supplied to the multiplier 344.

Figure 5:
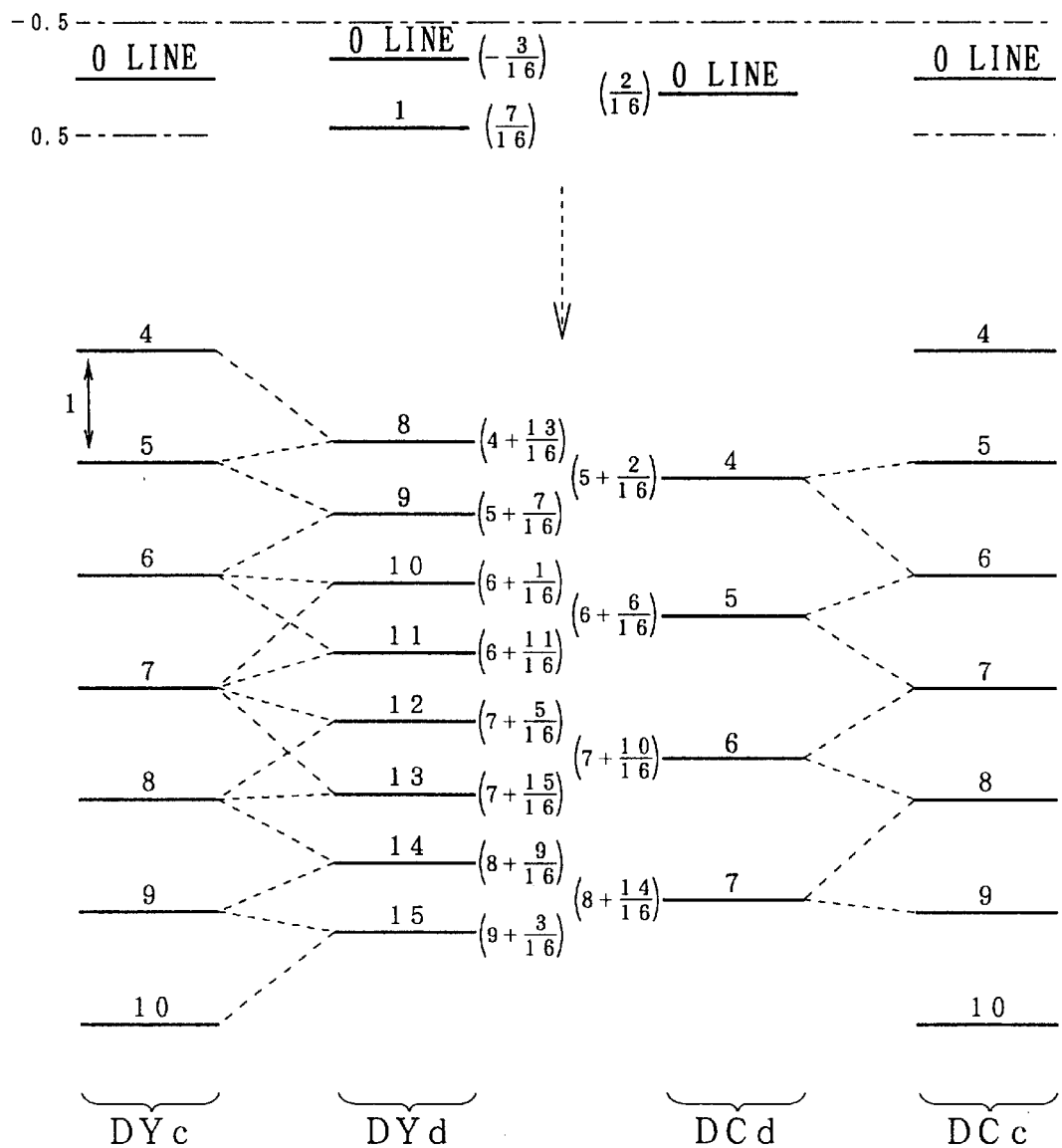
FIG. 5 is a diagram showing space positions of a luminance signal and a color difference signal when the number of lines is increased by "8/5" times.

The operation of the unit 30 for changing the number of lines will now be described. FIG. 5 shows the space positions of the luminance signal and the color difference signal when the magnification of the conversion of the number of lines is larger than the same size and is equal to or smaller than double, for example, 8/5 times, signals in the 4:2:2 format are converted into those in the 4:2:0 format and the formatted signals are outputted.

FIG. 5 shows a case where the luminance signal DYc and the color difference signal DCc in the 0th line are signals corresponding to, for example, an area from "−0.5" to "0.5" in the vertical direction of an image and the positions of the luminance signal and the color difference signal after the conversion of the number of lines are set by using the position of "−0.5" as a reference. The reference position is not limited to the position of "−0.5". It will be obviously understood that, for example, the position in the 0th line can be used as a reference.

When the number of lines is increased by "8/5" times, the line interval between the luminance signals DYd after conversion of the number of lines is $5/8$ of that of the luminance signals DYc. The 0th line after conversion of the number of lines is in the position of "$(-0.5)+(5/8)\times(1/2)=(-3/16)$".

Since the space position of the 0th line is in the position of "$-3/16$", the space position in the eighth line is "$(5/8)\times 8+$ "$(-3/16)=4+(13/16)$". The space position in the ninth line is the position of "$5+(7/16)$" obtained by adding "$5/8$" to the position in the eighth line.

Further, since the 4:2:0 format is obtained by the conversion of the number of lines, when it is assumed that the color difference signal DCd is positioned in an intermediate position between the luminance signals DYd, for example, the color difference signal DCd in the fourth line is in an intermediate position of "$5+(2/16)$" between the luminance signal DYd in the eighth line and the luminance signal DYd in the ninth line. The color difference signal in the fifth line is in an intermediate position of "$6+(6/16)$" between the luminance signal DYd in the tenth line and the luminance signal DYd in the eleventh line.

The luminance signals DYc in the respective lines are alternately recorded into the line memories 321 and 322 every line on the basis of the write enable signals WEN1 and WEN2 and the write address signals WADR1 and WADR2 generated by the line memory control circuit 361. The color difference signals DCc in the respective lines are alternately recorded into the line memories 341 and 342 every line. The space positions of the luminance signal DYc and the color difference signal DCc recorded in the line memories are determined by the count values MAINCNT of the MAIN counter 362.

The space position of the luminance signal DYc after the change in the number of lines and the format conversion is shown by the count value YCNTA of the YA counter 365 and the count value YCNTB of the YB counter 366 for sequentially adding the step amount set according to the magnification of the number of lines to the reference position. The space position of the color difference signal DCc is indicated by the count value CCNT of the C counter 367.

For example, in case of generating the luminance signal DYd in the eighth line, by outputting the luminance read enable signals RENY1 and RENY2 and the luminance read address signals RADRY1 and RADRY2 from the luminance signal reading circuits 381 and 382 at the timings when the luminance signals DYc in the fourth and fifth lines are written into the line memories 321 and 322 on the basis of the count value MAINCNT of the MAIN counter 362, the luminance signals DYc in the fourth and fifth lines are simultaneously read. Since the write start address signals WADR1top and WADR2top indicative of the write start positions of the signals in the fourth and fifth lines are supplied as the luminance read start address signals RADRY1top and RADRY2top to the luminance signal reading circuits 381 and 382, the luminance signals DYc in the fourth and fifth lines can be accurately read.

Since the space position of the luminance signal DYd is indicated by the count value YCNTA of the YA counter 365 and the count value YCNTB of the YB counter 366, the decimal fraction part ($=13/16$) of the count value indicative of the space position of the luminance signal DYd in the eighth line and a subtracted value ($=3/16$) obtained by subtracting the decimal fraction part from "1" are supplied as the luminance signal coefficients KY1 and KY2 to the multipliers 323 and 324.

The luminance signal DYc in the fourth line read from the line memories 321 and 322 is multiplied by the subtracted value ($=3/16$). The luminance signal DYc in the fifth line is multiplied by the decimal fraction part ($=13/16$), and the resultant values are added by the adder 325, thereby enabling the luminance signal DYd in the eighth line to be generated. Similarly, the luminance signal DYd in the ninth line can be generated.

Further, at the occasion of generating the luminance signals DYd in the eighth and ninth lines from the luminance signals DYc in the fourth, fifth, and sixth lines, similarly, by the color difference read enable signals RENC1 and RENC2 and the color difference read address signals RADRC1 and RADRC2 from the color difference signal reading circuits 383 and 384, the color difference signals DCc in the fifth and sixth lines are read from the line memories 341 and 342 Further, the color difference signals DCc in the fifth and sixth lines are multiplied by the color difference signal coefficients KC1 and KC2 based on the decimal fraction part of the count value CCNT of the C counter 367 and the resultant values are added, thereby generating the color difference signal DCd in the fourth line. In such a manner, the 4:2:2: format can be simultaneously converted to the 4:2:0 format.

The luminance signal DYc and the color difference signal DCc of the same line number are written in the line memories 321 and 341 and also the luminance signal DYc and the color difference signal DCc of the same line number are written in the line memories 322 and 342. At the occasion of simultaneously generating the luminance signals DYd of the two lines and the color difference signals DCd of the one line, a case where the required luminance signal DYc and the color difference signal DCc have different line numbers occurs. For example, the case where the luminance signals DYd in the eighth and ninth lines and the color difference signal DCd in the fourth line are generated occurs.

Further, new signals are sequentially recorded into the line memories 321, 322, 341, and 342 in a ring method. Consequently, timings at which the required luminance signal DYc and the color difference signal DCc are written into the line memories 321, 322, 341 and 342 are determined by the SUB counter 363 and the decoder 372. Only the required luminance signal DYc and color difference signal DCc are read. The coefficients KY1, KY2, KC1, and KC2 are also generated at correct timings.

FIGS. 6A to 6N and FIGS. 7A to 7N show signals generated by the interpolation control unit 36 of the unit 30 for changing the number of lines and show, for example, a case where the data amount of the luminance signal DYc and the color difference signal DCc of one line is 640 pixels and a line memory to which the data amount of 800 pixels can be written is used. Since the luminance signal DYc and the color difference signal DCc are written into the line memories 321, 322, 341 and 342 in the ring method as described above, line memories each having the memory capacity larger than the data amount of the luminance signal DYc of one line and the color difference signal DCc of one line are used. When a new signal is written, it takes time to update the written signal to a new signal. Consequently, the signal, which has been already written, can be correctly read while the new signal is being written.

FIG. 6A shows the horizontal pulse signal HD in the timing signal TM supplied to the unit 30 for changing the number of lines. FIG. 6B illustrates the luminance signal DYc and the color difference signal DCc supplied to the unit 30 for changing the number of lines. Numerals written in parentheses in FIG. 6B denote the line numbers.

FIGS. 6C and 6D show the write enable signals WEN1 and WEN2 generated by the line memory control circuit 361. When the signal level of the write enable signal WEN1 is set to the low level "L", the inputted luminance signal DYc and the inputted color difference signal DCc are written into the line memories 321 and 341. When the signal level of the write enable signal WEN2 is set to the low level "L", the inputted luminance signal DYc and the inputted color difference signal DCc are written into the line memories 322 and 342. Numerals shown in FIGS. 6C and 6D indicate addresses in the write start positions and write end positions of the signals.

For example, when the write enable signal WEN1 is set to the low level "L" at time point t1, the luminance signals DYc in the fourth line are written into the position of addresses "0 to 639" in the line memory 321. The color difference signals DCc in the fourth line are written into the position of addresses "0 to 639" in the line memory 341.

When the write enable signal WEN2 is set to the low level "L" at the time point of t3, the luminance signals DYc in the fifth line are written into the position of addresses "0 to 639" in the line memory 322. The color difference signals in the fifth line are written into the position of addresses "0 to 639" in the line memory 342. Similarly, the luminance signal and the color difference signal are written alternately into the two line memories every line.

FIGS. 6E and 6F show the write start address signals WADR1top and WADR2top generated by the line memory control circuit 361. When the signal is started to be written from the position of the address "0" in each of the line memories 321 and 341 at the time point t1, the write start address signal WADR1top becomes "0". When the signal writing operation is started from the position of the address "0" in each of the line memories 322 and 342 at the time point t3, the write start address signal WADR2top becomes "0".

FIG. 6G shows the pulse signal HM generated by the line memory control circuit 361. The pulse signal HM is a signal that is synchronized with the horizontal pulse signal HD and its frequency is twice as high as that of the horizontal pulse signal HD.

FIG. 6H shows the count value SUBCNT of the SUB counter 363. In this case, since the number of lines is changed by "8/5" times, the SUB counter 363 takes the form of a quadruple counter.

FIG. 6J illustrates the count value MAINCNT of the MAIN counter 362 for counting the number of lines of the luminance signals DYc and the color difference signals DCc transmitted to the linear interpolating unit 32, synchronously with the pulse signal HM. For example, when the luminance signals DYc and the color difference signals DCc in the fourth line at the time point t1 are supplied to the linear interpolating unit 32 and written into the line memories, the counting operation is performed at the trailing timing of the pulse signal HM at the time point t2 and the count value MAINCNT is set to "4".

FIGS. 6K to 6M show the count value YCNTA of the YA counter 365, the count value YCNTB of the YB counter 366, and the count value CCNT of the C counter 367, respectively. Each of the count values YCNTA and YCNTB denotes the space position of the luminance signal DYd generated by the process of changing the number of lines. The count value CCNT denotes the space position of the generated color difference signal DCd.

FIG. 6N shows the decoding signal DEC from the decoder 372. As shown in FIG. 8, the decoder 372 generates the decoding signal DEC on the basis of the integer part of each of the count value SUBCNT of the SUB counter 363, the count value YCNTA of the YA counter 365, the count value YCNTB of the YB counter 366, and the count value CCNT of the C counter 367.

When the count value SUBCNT is "0" or "2", the integer part of the count value YCNTA is equal to "count value MAINCNT - 1". When the integer part of each of the count values YCNTB and CCNT is equal to the count value MAINCNT, the decoding signal DEC is equal to "1".

When the count value SUBCNT is "0" or "2", the integer part of each of the count values YCNTA and CCNT is equal to "count value MAINCNT - 1". When the integer part of the count value YCNTB is equal to the count value MAINCNT, the decoding signal DEC is "3".

Further, when the count value SUBCNT is "1" or "3" and the integer part of each of the counter values YCNTA, YCNTB and CCNT is equal to "count value MAINCNT - 1", the decoding signal DEC is "2". In the other cases, the decoding signal DEC is "0", When the decoding signal is "1", "2", or "3", the state is held only for two cycles of the pulse signal HM.

When the decoding signal is "1", it shows a case where the line number of the luminance signal DYc and that of the color difference signal DCc required at the occasion of generating the luminance signals DYd of two lines and the color difference signals DCd of one line, are different and the luminance signal DYc of the line number smaller than that of the color difference signal DCc is required. For example, it is the case shown in FIG. 5 of generating the luminance signals DYd in the eighth and ninth lines and the color difference signals DCd in the fourth line.

When the decoding signal is "2", it shows a case where the line number of the luminance signal DYc and that of the color difference signal DCc required to generate the luminance signals DYd of two lines and the color difference signals DCd of one line are equal. For example, it is the case shown in FIG. 5 where the luminance signals DYd in the tenth and eleventh lines and the color difference signal DCd in the fifth line are generated.

When the decoding signal is "3", it shows the case where the line number of the luminance signal DYc and that of the color difference signal DCc required to generate the luminance signals DYd of two lines and the color difference signal DCd of one line are different and the luminance signal DYc whose line number is larger than that of the color difference signal DCc is required. For example, it shows the case where the luminance signals DYd in the 14th and 15th lines and the color difference signal DCd in the 7th line are generated.

When the decoding signal is "0", it shows a timing at which the luminance signal DYc and the color difference signal DCc which are required to generate the luminance signals DYd of two lines and the color difference signals DCd of one line cannot be read from the line memories.

When the count value SUBCNT of the SUB counter 363 is "0" at the time point t4, the integer part of the count value YCNTA of the YA counter 365 is "4", each of the integer part of the count value YCNTB of the YB counter 366 and the integer part of the count value CCNT of the C counter 367 is "5", and the count value MAINCNT of the MAIN counter 362 is "5". Consequently, the decoding signal DEC becomes "1" from the time point t4 to the time point t8 after elapse of two cycles of the pulse signal HM on the basis of FIG. 8.

When the count value SUBCNT of the SUB counter 363 is set to "2" at the time point t8, each of the integer part of the count value YCNTA of the YA counter 365, the integer part of the count value YCNTB of the YB counter 366 and the integer part of the count value CCNT of the C counter 367 becomes "6", which is equal to the count value MAINCNT of the MAIN counter 362. The decoding signal DEC consequently becomes "0" on the basis of FIG. 8.

When the count value SUBCNT of the SUB counter 363 is set to "3" at the time point t9, each of the integer part of the count value YCNTA of the YA counter 365, the integer part of the count value YCNTB of the YB counter 366 and the integer part of the count value CCNT of the C counter 367 becomes "6", which is equal to the value obtained by subtracting "1" from the count value MAINCNT "7" of the MAIN counter 362. On the basis of FIG. 8, consequently, the decoding signal DEC becomes "2" for two cycles of the pulse signal HM from the time point t9. Similarly, the decoding signal DEC is generated thereafter.

FIGS. 7A, 7B, 7C, and 7D show read start address signals transmitted from the head address transfer control circuit 374. The head address transfer control circuit 374 supplies the write start address signals WADR1top and WADR2top received from the line memory control circuit 361 as the luminance read start address signals RADRY1top and RADRY2top and the color difference read start address signals RADRC1top and RADRC2top to the luminance signal reading circuits 381 and 382 and the color difference signal reading circuits 383 and 384, in the event of change in the count value SUBCNT of the SUB counter 363, and at the timing based on the change in the count value SUBCNT of the SUB counter 363 and the value of the decoding signal DEC, as shown in FIG. 9.

The write start address signal WADR1top is supplied as the luminance read start address signal RADRY1top to the luminance signal reading circuit 381 at the timing when the count value SUBCNT of the SUB counter 363 is changed from "0" to "1". The write start address signal WADR2top is supplied as the luminance read start address signal RADRY2top to the luminance signal reading circuit 382 at the timing when the count value SUBCNT of the SUB counter 363 is changed from "2" to "3".

The write start address signal WADR1top is supplied as the color difference read start address signal RADRC1top to the color difference signal reading circuit 383 at the timing when the count value SUBCNT of the SUB counter 363 is changed from "0" to "1" and at the timing just before the signal written in the line memory is started to be read when the count value SUBCNT of the SUB counter 363 is "0".

Further, the write start address signal WADR2top is supplied as the read start address signal RADRC2top to the color difference signal reading circuit 384 at the timing when the count value SUBCNT of the SUB counter 363 is changed from "2" to "3" and at the timing just before the signal written in the line memory is started to be read when the decoding signal DEC is "1" and the count value SUBCNT of the SUB counter 363 is "2".

Since the value of the decoding signal DEC is set to "1" and the count value SUBCNT of the SUB counter 363 is "0" at the time point t4 (see FIGS. 6H and 6N), the write start address signal WADR1top shown in FIG. 6E is supplied as the color difference read start address signal RADRC1top shown in FIG. 7C to the color difference signal reading circuit 383 at the timing of the time point t5 just before the signals written in the line memories are started to be read on the basis of FIG. 9.

Since the count value SUBCNT of the SUB counter 363 is changed from "0" to "1" at the time point t6 (see FIG. 6H), the write start address signal WADR1top is supplied as the luminance read start address signal RADRY1top shown in FIG. 7A to the luminance signal reading circuit 381 on the basis of FIG. 9 and also supplied as the color difference read start address signal RADRC1top to the color difference signal reading circuit 383.

Since the count value SUBCNT of the SUB counter 363 is changed from "2" to "3" at the time point t9 (see FIG. 6H), the write start address signal WADR2top shown in FIG. 6F is supplied as the luminance read start address signal RADRY2top shown in FIG. 7B to the luminance signal reading circuit 382 on the basis of FIG. 9. The write start address signal WADR2top is also supplied as the read start address signal RADRC2top shown in FIG. 7D to the color difference signal reading circuit 384. The read start address signals are similarly supplied from the head address transfer control circuit 374 to the luminance signal reading circuits 381 and 382 and the color difference signal reading circuits 383 and 384 thereafter.

FIGS. 7E to 7H show the luminance read enable signals RENY1 and RENY2 and the color difference read enable signals RENC1 and RENC2 outputted from the luminance signal reading circuits 381 and 382 and the color difference signal reading circuits 383 and 384.

The luminance signal reading circuit 381 supplies the luminance read enable signal RENY1 and the luminance read address signal RADRY1 generated on the basis of the luminance read start address signal RADRY1top sent from the head address transfer control circuit 374 to the line memory 321 at the timing based on a timing signal RTM from the line memory control circuit 361. The luminance read address signal RADRY1 is generated so that the luminance signals of one line stored in the line memory 321 can be read in a period shorter than one cycle of the pulse signal HM.

For example, as shown in FIG. 7E, the signal level of the luminance read enable signal RENY1 is set to the low level "L" at the time point t5 after elapse of a predetermined time from the time point t4 in response to the timing signal RTM and the luminance signal written in the line memory 321 is sequentially read on the basis of the luminance read address signal RADRY1.

The reading operation of the luminance signals of one line is completed before the time point t6 after elapse of one cycle of the pulse signal HM from the time point t4.

The signal level of the luminance read enable signal RENY1 is again set to the low level "L" at the time point t7, the luminance signals written in the line memory 321 are read on the basis of the luminance read address signal RADRY1 and the luminance signals of two lines are read for the period of two cycles of the pulse signal HM.

The numerals in FIG. 7E show the read address positions of the luminance signals written in the line memory and numerals in the parentheses show the line numbers of the luminance signals to be read. The numerals are similarly shown in FIGS. 7F to 7H.

In a manner similar to the luminance signal reading circuit 381, in the luminance signal reading circuit 382 as well, the signal level of the luminance read enable signal RENY2 shown in FIG. 7F is set to the low level, "L", and the luminance signals DYc written in the line memory 322 are sequentially read on the basis of the luminance read address signal RADRY2.

In a manner similar to the luminance signal reading circuit, also in the color difference signal reading circuits 383 and 384, the signal level of each of the color difference read enable signals RENC1 and RENC2 shown in FIGS. 7G and 7H is set to the low level, "L", and the color difference signals DCc written in the line memories 341 and 342 are started to be read on the basis of the color difference read address signals RADRC1 and RADRC2.

Since the unit 30 for changing the number of lines converts the signal in the 4:2:2: format into that in the 4:2:0 format and outputs the resultant signal, the reading operation of the color difference signal DCc is set to the half of that of the luminance signal DYc. When the luminance signals DYc of one line are read twice from the line memories 321 and 322, the color difference signals DCc of one line are read once from the line memories 341 and 342.

Such the luminance signal DYc and the color difference signal DCc read from the line memories are supplied to the multipliers.

FIGS. 7J to 7M show the luminance signal coefficients KY1 and KY2 and the color difference signal coefficients KC1 and KC2 generated by the coefficient generating circuit 385. In the coefficient generating circuit 385, when the decoding signal DEC from the decoder 372 is not "0", as shown in FIG. 10, on the basis of the count value SUBCNT of the SUB counter 363, the decimal fraction part of each of the count value YCNTA of the YA counter 365 and the count value YCNTB of the YB counter 366, the luminance signal coefficients KY1 and KY2 for generating a new luminance signal DYd by linear interpolation from the luminance signals DYc of two lines are set.

As shown in FIG. 11, on the basis of the decimal fraction part of each of the count value SUBCNT of the SUB counter 363, the decoding signal DEC from the decoder 372 and the count value CCNT of the C counter 367, the color difference signal coefficients KC1 and KC2 for generating a new color difference signal DCd by linear interpolation from the color difference signals DCc of two lines are set.

In generating the luminance signals DYd of the first line in a state where the count value SUBCNT of the SUB counter 363 is "1" or "2" and new luminance signals DYd of two lines are generated by reading the luminance signal twice from the line memory, the luminance signal coefficient KY1 is set to a value of the decimal fraction part of the count value YCNTA of the YA counter 365 and the luminance signal coefficient KY2 is set to a value obtained by subtracting the decimal fraction part of the count value YCNTA of the YA counter 365 from "1".

At the occasion of generating the luminance signals DYd in the second line, the luminance signal coefficient KY1 is set to a value of the decimal fraction part of the count value YCNTB of the YB counter 366 and the luminance signal coefficient KY2 is set to a value obtained by subtracting the decimal fraction part of the count value YCNTB of the YB counter 366 from "1".

In generating the luminance signals DYd in the first line in a state where the count value SUBCNT is "0" or "3", the luminance signal coefficient KY1 is obtained by subtracting the decimal fraction part of the count value YCNTA of the YA counter 365 from "1" and the luminance signal coefficient KY2 is set as a value of the decimal fraction part of the count value YCNTA of the YA counter 365. In generating the luminance signal DYd in the second line, the luminance signal coefficient KY1 is obtained by subtracting the decimal fraction part of the count value YCNTB of the YB counter 366 from "1" and the luminance signal coefficient KY2 is set to the value of the decimal fraction part of the count value YCNTB of the YB counter 366.

When the decoding signal DEC is "2" or "3" and the count value SUBCNT is "1" or "2", and when the decoding signal DEC is "1" and the count value SUBCNT is "0" or "1", the color difference signal coefficient KC1 is set to the value of the decimal fraction part of the count value CCNT of the C counter 367.

When the decoding signal DEC is "2" or "3" and the count value SUBCNT is "0" or "3", and when the decoding signal DEC is "1" and the count value SUBCNT is "2" or "3", the color difference signal coefficient KC1 is set to the value obtained by subtracting the decimal fraction part of the count value CCNT of the C counter 367 from "1".

When the decoding signal DEC is "2" or "3" and the count value SUBCNT is "1" or "2", and when the decoding signal DEC is "1" and the count value SUBCNT is "0" or "1", the color difference signal coefficient KC2 is set to the value obtained by subtracting the decimal fraction part of the count value CCNT of the C counter 367 from "1".

When the decoding signal DEC is "2" or "3" and the count value SUBCNT is "0" or "3", and when the decoding signal DEC is "1" and the count value SUBCNT is "2" or "3", the color difference signal coefficient KC2 is set to the value of the decimal fraction part of the count value CCNT of the C counter 367.

Since the decoding signal DEC shown in FIG. 6N becomes "1" at the time point t4 and the count value SUBCNT of the SUB counter 363 shown in FIG. 6H is "0", new luminance signals of two lines are generated by reading the luminance signal from the line memory twice during the period in which the decoding signal DEC is "1". At the occasion thereof, the luminance signal coefficient KY1 when the luminance signal in the first line is generated is a value obtained by subtracting the decimal fraction part of the count value YCNTA of the YA counter 365 from "1" on the basis of FIG. 10, that is, equal to "3/16" as shown in FIG. 7J. Similarly, the luminance signal coefficient KY2 becomes "13/16" as shown in FIG. 7K.

Since the count value SUBCNT of the SUB counter 363 is "1", the luminance signal coefficient KY1 at the occasion of generating the luminance signal in the second line becomes the decimal fraction part of the count value YCNTB of the YB counter 366 on the basis of FIG. 10, that is, equal to "7/16". The luminance signal coefficient KY2 becomes "9/16".

Further, since the count value SUBCNT of the SUB counter 363 is "0" or "1" during the period from the time point t4 to the time point t8 where the decoding signal DEC is "1", the color difference signal coefficient KC1 is set to the decimal fraction part of the count value CCNT of the C counter 367, that is, "2/16" as shown in FIG. 7L. The color difference signal coefficient KC2 is set to "14/16" as shown in FIG. 7M.

By supplying the luminance signal coefficients KY1 and KY2 thus obtained to the multipliers 323 and 324, a new luminance signal DYd shown in FIG. 7N where the number of lines is increased by "8/5" times can be obtained by the linear interpolation from the adder 325. Numerals in parentheses in FIG. 7N denote the line numbers of the color difference signals DCd, which will be described hereinafter.

The luminance signal DYc in the fourth line received from the memory 321, from which signals are started to be read at the time point t5, is multiplied by the luminance signal coefficient KY1 (=3/16). The luminance signal DYc in the, fifth line received from the memory 322 is multiplied by the luminance signal coefficient KY2 (=13/16). The two luminance signals are added, thereby enabling the luminance signal DYd in the eighth line to be generated.

The luminance signal DYc in the sixth line received from the memory 321, from which signals are started to be read at the time point t7, is multiplied by the luminance signal coefficient KY1 (=7/16). The luminance signal DYc in the fifth line received from the memory 322 is multiplied by the luminance signal coefficient KY2 (=9/16). The two luminance signals are added, thereby enabling the luminance signal DYd in the ninth line to be generated.

By supplying the color difference signal coefficients KC1 and KC2 to the multipliers 343 and 344, respectively, the conversion of the number of lines can be performed by linear interpolation and the color difference signal DCd in the 4:2:0 format can be obtained from the adder 345.

For example, the color difference signals DCc in the sixth line received from the memory 341, from which signals are started to be read at the time points t5 and t7, are multiplied by the color difference signal coefficient KC1 (=14/16). The color difference signals DCc in the fifth line received from the memory 342 are multiplied by the color difference signal coefficient KC2 (=2/16). The two color difference signals are added, thereby enabling the color difference signal DCd in the fourth line to be generated.

By performing similar processes, the unit 30 for changing the number of lines generates the luminance signal DYd and the color difference signal DCd in the 4:2:0 format having the number of lines which has been increased by 8/5 times from the luminance signal DYc and the color difference signal DCc in the 4:2:2 format.

When the step amount setting circuit 369 increases the step amount of each of the YA counter 365, the YB counter 366, and the C counter 367 by the step setting signal STP issued therefrom, the number of lines to be changed can be reduced.

When the step amount setting circuit 369 reduces the step amount, the multiple of changing the number of lines can be increased. The multiple of changing the number of lines varies within the range from a value larger than the same size to that equal to or smaller than double.

When the number of lines is increased to a value which is larger than double and equal to or smaller than four times, for example, a case of a zooming operation performed by an electric signal process, that is, a case of magnifying an obtained image by 16/5 times by what is called an electronic zoom will be described.

Figures 12, 15:
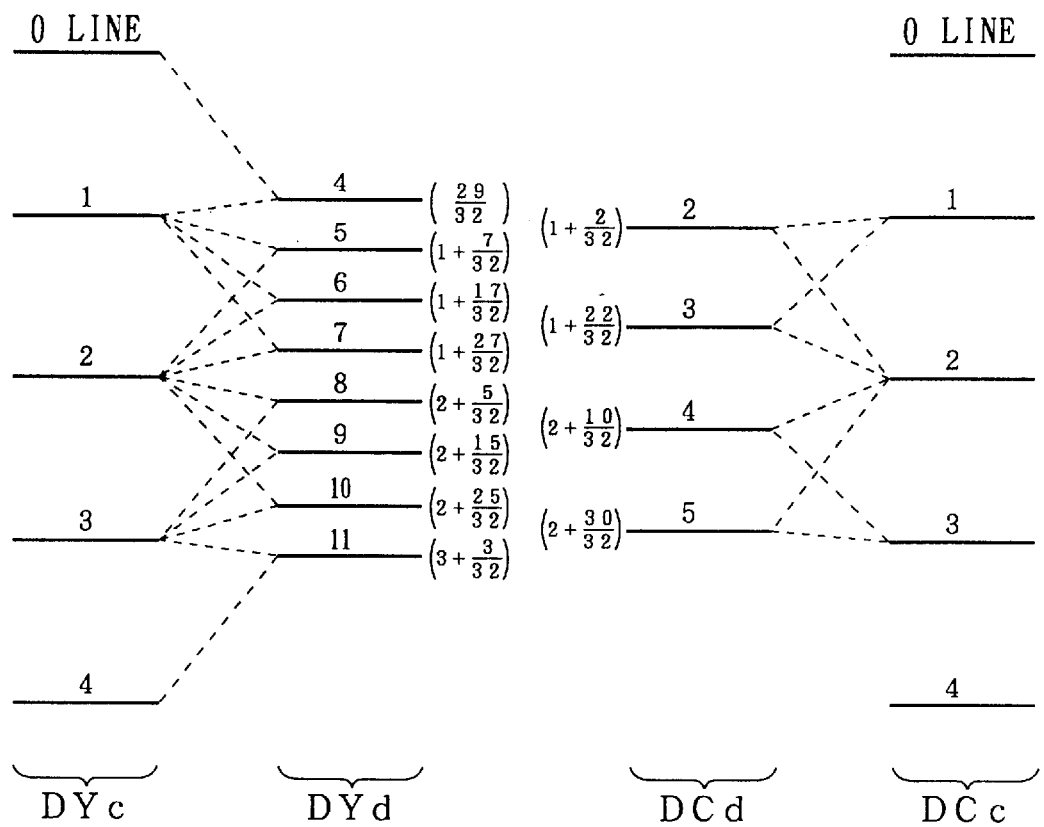
FIG. 12 is a diagram showing space positions of a luminance signal and a color difference signal when the number of lines is increased by "16/5" times as another embodiment of the invention.
FIG. 15 is a diagram for explaining an operation executed when the format conversion is performed by increasing the number of lines by "16/5" times.

FIG. 12 shows the space positions of the luminance signal and the color difference signal when the multiple of the number of lines is set to 16/5 times, a signal in the 4:2:2 format is converted into a signal in the 4:2:0 format, and the resultant signal is outputted.

In case of increasing the number of lines by "16/5" times, the line interval of the luminance signals DYd after the conversion of the number of lines is "5/16" of that of the luminance signals DYc. In a manner similar to the case shown in FIG. 5, when the position of "−0.5" is used as a reference, the position of the luminance signals DYd in the fourth line is set to the position of "29/32". The position of the luminance signals DYd in the fifth line is the position of "1+(7/32)" obtained by adding "5/16" to the position in the fourth line.

Further, when the color difference signal DCd is positioned in an intermediate position of the luminance signals DYd since a signal is converted to the one in the 4:2:0 format after the conversion of the number of lines, for example, the color difference signal DCd in the second line is positioned in an intermediate position of "1+(2/32)" between the luminance signal DYd in the fourth line and the luminance signal DYd in the fifth line.

FIGS. 13A to 13N and FIGS. 14A to 14N show signals in the unit 30 for changing the number of lines when the multiple of the change in the number of lines is set to 16/5 times.

FIG. 13A shows the horizontal pulse signal HD and FIG. 13B illustrates the luminance signal DYc and the color difference signal DCc supplied to the unit 30 for changing the number of lines. Numerals shown in the parentheses in FIG. 13B denote line numbers. Since an electronic zooming operation is performed by using the center of an image as a reference, the unit 30 for changing the number of lines receives a predetermined data amount of the luminance signal and the color difference signal in and around the center part of the pulse interval of the horizontal pulse signal HD.

FIGS. 13C and 13D show the write enable signals WEN1 and WEN2. When the write enable signal WEN1 is set to the low level, "L", the luminance signal DYc and the color difference signal DCc are written into the line memories 321 and 341.

When the signal level of the write enable signal WEN2 is set to the low level, "L", the luminance signal DYc and the color difference signal DCc are written into the line memories 322 and 342. Numerals shown in FIGS. 13C and 13D denote addresses of the write start positions and the write end positions of signals.

When the write enable signal WEN2 is set to the low level, "L", at the time point t11, the luminance signals DYc in the first line are written into the position of addresses "0 to 639" in the line memory 322 and the color difference signals DCc in the first line are written into the position of addresses "0 to 639" in the line memory 341.

FIGS. 13E and 13F show the write start address signals WADR1top and WADR2top, respectively. When the signal writing operation is started from the position of the address "0" in each of the line memories 322 and 342 at the time point t11, the write start address signal WADR2top becomes "0".

FIG. 13G shows the pulse signal HM generated by the line memory control circuit 361. The pulse signal HM is a signal synchronized with the horizontal pulse signal HD and has the frequency four times as high as that of the horizontal pulse signal HD.

FIG. 13H illustrates the count value SUBCNT of the SUB counter 363. In this case, since the multiple of the change in the number of lines is "16/5" times, which is larger than twice and smaller than four times, the SUB counter 363 takes the form of an octal counter.

FIG. 13J shows the count value MAINCNT of the MAIN counter 362. When the luminance signal DYc in the first line and the color difference signal DCc in the first line are supplied to the linear interpolating unit 32 and written into the line memories at the time point t11, counting is performed at the trailing timing of the pulse signal HM at the time point t12 and the count value MAINCNT is set to "1".

FIGS. 13K to 13M show the count value YCNTA of the YA counter 365, the count value YCNTB of the YB counter 366, and the count value CCNT of the C counter 367, respectively.

FIG. 13N shows the decoding signal DEC from the decoder 372. When the number of lines is increased by "16/5" times, as shown in FIG. 15, the decoder 372 generates the decoding signal DEC on the basis of the integer parts of the count value SUBCNT of the SUB counter 363, the count value YCNTA of the YA counter 365, the count value YCNTB of the YB counter 366, and the count value CCNT of the C counter 367.

For example, when the count value SUBCNT of the SUB counter 363 is set to "0" at the time point t13, the integer part of the count value YCNTA of the YA counter 365 is "0", the integer part of each of the count value YCNTB of the YB counter 366 and the count value CCNT of the C counter 367 is "1", and the count value MAINCNT of the MAIN counter 362 is "1". Therefore, the decoding signal DEC becomes "0" on the basis of FIG. 15.

When the count value SUBCNT of the SUB counter 363 is set to "1" at the time point t14, the integer part of the count value YCNTA of the YA counter 365 is "0", the integer part of each of the count value YCNTB of the YB counter 366 and the count value CCNT of the C counter 367 is "1" and the count value MAINCNT of the MAIN counter 362 is "1". Therefore, the decoding signal DEC is "1" from the time point t14 to the time point t18 after elapse of two cycles of the pulse signal HM on the basis of FIG. 15.

The count value SUBCNT of the SUB counter 363 becomes "3" at the time point t18 and the integer part of each of the count value YCNTA of the YA counter 365, the count value YCNTB of the YB counter 366, and the count value CCNT of the counter 367 is "1" and the count value MAINCNT of the MAIN counter 362 is "2", so that the decoding signal DEC becomes "2" from the time point t18 to the time point t19. Similarly, the decoding signal DEC is generated thereafter.

FIGS. 14A, 14B, 14C, and 14D show read start address signals outputted from the head address transfer control circuit 374. On the basis of FIG. 16, the luminance read start address signals RADRY1top and RADRY2top and the color difference read start address signals RADRC1top and RADRC2top are supplied to the luminance signal reading circuits 381 and 382 and the color difference signal reading circuits 383 and 384, respectively.

Since the value of the decoding signal DEC is set to "1" and the count value SUBCNT of the SUB counter 363 is "1" at the time point t14, the write start address signal WADR1top shown in FIG. 13E is supplied as the color difference read start address signal RADRC1top shown in FIG. 14C to the color difference signal reading circuit 383 at the timing of the time point t15 just before the signal written in the line memory is started to be read on the basis of FIG. 16.

Since the count value SUBCNT of the SUB counter 363 is changed from "1" to "2" at the time point t16, on the basis of FIG. 16, the write start address signal WADR1top is supplied as the luminance read start address signal RADRY1top shown in FIG. 14A to the luminance signal reading circuit 381 and also supplied as the color difference read start address signal RADRCt1top to the color difference signal reading circuit 383. Since the color difference read start address signal RADRC1top is set to "640" at the time point t14, the address value does not change.

Since the count value SUBCNT of the SUB counter 363 is changed from "5" to "6" at the time point t20, on the basis of FIG. 16, the write start address signal WADR2top shown in FIG. 13F is supplied as the luminance read start address signal RADRY2top shown in FIG. 14B to the luminance signal reading circuit 382 and also supplied as the read start address signal RADRC2top shown in FIG. 14D to the color difference signal reading circuit 384.

Similarly, the head address transfer control circuit 374 supplies the read start address signals to the luminance signal reading circuits 381 and 382 and the color difference signal reading circuits 383 and 384.

FIGS. 14E to 14H show luminance read enable signals RENY1 and RENY2 and the color difference read enable signals RENC1 and RENC2 outputted from the luminance signal reading circuits 381 and 382 and the color difference signal reading circuits 383 and 384, respectively.

The luminance signal reading circuit 381 supplies the luminance read address signal RADRY1 to the line memory 321 at the timing based on the timing signal RTM from the line memory control circuit 361. The luminance read address signal RADRY1 is generated so that the luminance signals of one line stored in the line memory 321 can be read for a period shorter than one cycle of the pulse signal HM.

For example, as shown in FIG. 14E, the signal level of the luminance read enable signal RENY1 is set to the low level, "L", at the time point t15 after elapse of a predetermined time from the time point t14 in response to the timing signal RTM. The luminance signal written in the line memory 321 is sequentially read on the basis of the luminance read address signal RADRY1.

The reading of the luminance signals of one line is completed before the time point t16 after elapse of one cycle of the pulse signal HM from the time point t14. The signal level of the luminance read enable signal RENY1 is again set to the low level, "L", at the time point t17, the luminance signal written in the line memory 321 is read on the basis of the luminance read address signal RADRY1, and the luminance signal reading operation is similarly executed thereafter.

Numerals in FIG. 14E denote the read address positions of the luminance signals stored in the line memory. Numerals shown in parentheses denote line numbers of the luminance signals to be read. FIGS. 14F to 14H similarly show numerals.

In a manner similar to the luminance signal reading circuit 381, in the luminance signal reading circuit 382, the signal level of the luminance read enable signal RENY2 shown in FIG. 14F is set to the low level, "L" and the luminance signal written in the line memory 322 is read on the basis of the luminance read address signal RADRY2.

In the color difference signal reading circuits 383 and 384 as well, in a manner similar to the luminance signal reading circuit, the signal level of each of the color difference read enable signals RENC1 and RENC2 shown in FIGS. 14G and 14H is set to the low level, "L" and the color difference signals written in the line memories 341 and 342 are read on the basis of the color difference read address signals RADRC1 and RADRC2.

Since the unit 30 for changing the number of lines converts a signal in the 4:2:2 format into a signal in the 4:2:0 format and outputs the resultant signal, the color difference signal reading operation is set to the half of the luminance signal reading operation. The luminance signals of one line are read twice from the line memories 321 and 322 during the period of two cycles of the pulse signal HM, and the color difference signals of one line are read once from the line memories 341 and 342.

The luminance signal and the color difference signal read from the line memories in such a manner are supplied to the multipliers.

FIGS. 14J to 14M show the luminance signal coefficients KY1 and KY2 and the color difference signal coefficients KC1 and KC2 generated by the coefficient generating circuit 385, respectively. When the decoding signal DEC from the decoder 372 is not "0", the coefficient generating circuit 385 sets the luminance signal coefficients KY1 and KY2 on the basis of the count value SUBCNT of the SUB counter 363, and the decimal fraction part of each of the count value YCNTA of the YA counter 365 and the count value YCNTB of the YB counter 366, as shown in FIG. 17.

As shown in FIG. 18, the coefficient generating circuit 385 sets the color difference signal coefficients KC1 and KC2 on the basis of the count value SUBCNT of the SUB counter 363, the decoding signal DEC from the decoder 372, and the decimal fraction part of the count value CCNT of the C counter 367.

Since the count value SUBCNT of the SUB counter 363 shown in FIG. 13H is "1" when the decoding signal DEC shown in FIG. 13N becomes "1" at the time point t14, in reading the luminance. signal twice from the line memory and generating new luminance signals of two lines during a period in which the decoding signal DEC is "1", the luminance signal coefficient KY1 at the occasion of generating the luminance signal in the first line becomes a value obtained by subtracting the decimal fraction part of the count value YCNTA of the YA counter 365 from "1" on the basis of FIG. 17, that is, "3/32" as shown in FIG. 14J. Similarly, the luminance signal coefficient KY2 becomes "29/32" as shown in FIG. 14K.

Since the count value SUBCNT of the SUB counter 363 is "2", the luminance signal coefficient KY1 in generating the luminance signal in the second line becomes the decimal fraction part of the count value YCNTB of the YB counter 366 on the basis of FIG. 17, that is, "7/32" and the luminance signal coefficient KY2 becomes "25/32".

Further, since the count value SUBCNT of the SUB counter 363 is "1" or "2" during the period from the time point t14 to the time point t15 in which the decoding signal DEC is "1", as shown in FIG. 18, the color difference signal coefficient KC1 becomes the decimal fraction part of the count value CCNT of the C counter 367, that is, "2/32" as shown in FIG. 14L. The color difference signal coefficient KC2 becomes "30/32" as shown in FIG. 14M.

By supplying the luminance signal coefficients KY1 and KY2 thus obtained to the multipliers 323 and 324, the luminance signals DYd shown in FIG. 14N can be obtained from the adder 325. The number of lines of luminance signals DYd has been increased by "16/5" times by the linear interpolation. Numerals in parentheses in FIG. 14N show line numbers of the color difference signals DCd, which will be described herein later.

For example, the luminance signal DYc in the 0th line received from the memory 321, from which a signal is started to be read said signal DYc at the time point t15, is multiplied by the luminance signal coefficient KY1 (=3/32). The luminance signal DYc in the first line received from the memory 322 is multiplied by the luminance signal coefficient KY2 (=29/32). The two luminance signals are added, thereby enabling the luminance signal DYd in the fourth line to be generated.

Subsequently, the luminance signal DYc in the second line received from the memory 321, from which a signal is started to be read at the time point t17, is multiplied by the luminance signal coefficient KY1 (=7/32). The luminance signal DYc in the first line from the memory 322 is multiplied by the luminance signal coefficient KY2 (=25/32). The two luminance signals are added, thereby enabling the luminance signal DYd in the fifth line to be generated.

By supplying the color difference signal coefficients KC1 and KC2 to the multipliers 343 and 344, the number of lines can be changed by the linear interpolation and a color difference signal DCd in the 4:2:0 format can be obtained from the adder 345.

For example, the color difference signals DCc in the second line received from the memory 341, from which a signal is started to be read at the time points t15 and t17, are multiplied by the color difference signal coefficient KC1 (=2/32). The color difference signals DCc in the first line received from the memory 342 are multiplied by the color difference signal coefficient KC2 (=30/32). The two color difference signals are added, thereby enabling the color difference signal DCd in the second line to be generated.

By performing similar processes, the unit 30 for changing the number of lines generates the luminance signal DYd and the color difference signalDCdin the 4:2:0 format having the number of lines which has been increased by 16/5 times from the luminance signal DYc and the color difference signal DCc in the 4:2:2 format.

In this case as well, when the step amount of each of the YA counter 365, the YB counter 366, and the C counter 367 is increased by the step setting signal STP from the step amount setting circuit 369, the conversion magnification of the number of lines can be reduced. When the step amount is reduced, the conversion magnification of the number of lines can be increased. The conversion magnification of the number of lines varies within the range between a value larger than twice and a value equal to or smaller than four times. The operation like an electronic zoom can be consequently performed.

According to the embodiment of the invention, line memories each having the memory capacity larger than the data amount of the luminance signal of one line and the color difference signal of one line are used. The luminance signal is alternately recorded into two line memories one line by one line in the ring method and the color difference signal is alternately written into the two line memories one line by one line in the ring method. The number of reading times and the timings of the luminance signal and the color difference signal written in the line memories are controlled. The coefficient indicative of the space line position of a new luminance signal or a new color difference signal is multiplied by the luminance signal or the color difference signal read from the two line memories and the resultants are added. This enables the luminance signal and the color difference signal on which the conversion of the number of lines has been performed by the linear interpolation, to be generated and outputted in a real time manner.

By reading the color difference signal once from the two line memories when the luminance signal is read twice from the two line memories, the number of lines can be changed and simultaneously, for example, a signal in the 4:2:2 format can be converted to a signal in the 4:2:0 format in a real-time manner.

The conversion of the number of lines and the format conversion are not limited to the luminance signal and the color difference signal obtained by a digital still camera. Obviously, a luminance signal and a color difference signal obtained by a video camera or a luminance signal and a color difference signal generated by another electronic device can be used.

Although the case where the conversion magnification of the number lines is double and four times has been described in the foregoing embodiment, the invention can be also applied to a case where the number of lines is increased by more than four times, by switching the operation of each of the decoder 372, the head address transfer control circuit 374, and the coefficient generating circuit 385.

According to the invention, the luminance signals or color difference signals of one line are written into the line memory and the luminance signals and the color difference signals of one line written in the line memory are read a plurality of times during the signal writing period, thereby enabling the number of lines to be changed in a real time manner with a simple construction and without reducing the processing speed.

In reading the luminance signals of two lines from the line memories and generating new luminance signals of two lines obtained by changing the number of lines, the color difference signals of one line are read from the line memory and new color difference signals of one line obtained by changing the number of lines are generated. Further, the format conversion from the 4:2:2 format to the 4:2:0 format can be simultaneously performed.

By varying the count step amounts of the second and third counting means and the number of reading times of the luminance or color difference signals of one line written in the line memory during the writing period of the luminance signals of one line or the color difference signals of one line, the multiple of the number of lines can be easily changed.

While the above is a complete description of the preferred embodiments of the invention, various alternatives, modifications and equivalents may be used. Therefore, the above description should not be taken as limiting the scope of the invention as defined by the appended claims.

What is claimed is:

1. A video signal processing circuit comprising:
   first and second line memories for storing an inputted luminance signal, each having a memory capacity larger than a data amount of one line of the luminance signals;
   third and fourth line memories for storing an inputted color difference signal, each having a memory capacity larger than a data amount of one line of the color difference signals;
   first count means for indicating a space line position of each of the luminance signal and the color difference signal to be written in the first to fourth line memories;
   second count means for indicating a space line position of a luminance signal to be outputted;
   third count means for indicating a space line position of a color difference signal to be outputted;
   writing and reading means for alternately writing the inputted luminance signal into the first and second line memories every line in a ring method, alternately writing the inputted color difference signal every line into the third and fourth line memories in a ring method, determining a read start position and a read start timing of each of the luminance signals written in the first and second line memories and the color difference signals written in the third and fourth line memories by using integer parts of the first to third count means, and reading the written luminance and color difference signals;
   coefficient generating means for generating first to fourth coefficients by using decimal fraction parts of the second and third count means;
   a first multiplier for multiplying the luminance signal read from the first line memory by the signal writing and reading means by the first coefficient generated by the coefficient generating means;
   a second multiplier for multiplying the luminance signal read from the second line memory by the signal writing and reading means by the second coefficient generated by the coefficient generating means;
   a third multiplier for multiplying the color difference signal read from the third line memory by the signal writing and reading means by the third coefficient generated by the coefficient generating means;
   a fourth multiplier for multiplying the color difference signal read from the fourth line memory by the signal writing and reading means by the fourth coefficient generated by the coefficient generating means;
   a first adder for adding outputs of the first and second multipliers to generate a luminance signal whose space line position is shown by the second count means, and outputting the luminance signal; and
   a second adder for adding outputs of the third and fourth multipliers to generate a color difference signal whose space line position is shown by the third count means, and outputting the color difference signal.

2. The video signal processing circuit according to claim 1, further comprising step amount setting means for setting a count step amount of each of the second and third count means,
   wherein the signal writing and reading means switches a number of reading times of the luminance signals of one line or the color difference signals of one line written in each of the first to fourth line memories during a period of writing the luminance signals of one line or the color difference signals of one line to each of the first to fourth line memories.

3. The video signal processing circuit according to claim 1, wherein the signal writing and reading means reads the color difference signals of one line from the third and fourth line memories when the luminance signals of two lines are read from the first and second line memories.

4. An image pickup apparatus comprising:
   image pickup means for obtaining a luminance signal and a color difference signal of an obtained image;
   first and second line memories for storing the luminance signal obtained by the image pickup means, each having a memory capacity larger than a data amount of one line of the luminance signals;
   third and fourth line memories for storing the color difference signal obtained by the image pickup means, each having a memory capacity larger than a data amount of one line of the color difference signals;
   first count means for indicating a space line position of each of the luminance signal and the color difference signal which are written in the first to fourth line memories;
   second count means for indicating a space line position of a luminance signal to be outputted;
   third count means for indicating a space line position of a color difference signal to be outputted;
   writing and reading means for alternately writing the inputted luminance signal into the first and second line memories every line in a ring method, alternately writing the inputted color difference signal every line into the third and fourth line memories in a ring method, determining a read start position and a read start timing of each of the luminance signals written in the first and second line memories and the color difference signals written in the third and fourth line memories by using integer parts of the first to third count means, and reading the written luminance and color difference signals;
   coefficient generating means for generating first to fourth coefficients by using decimal fraction parts of the second and third count means;
   a first multiplier for multiplying the luminance signal read from the first line memory by the signal writing and reading means by the first coefficient generated by the coefficient generating means;
   a second multiplier for multiplying the luminance signal read from the second line memory by the signal writing and reading means by the second coefficient generated by the coefficient generating means;

a third multiplier for multiplying the color difference signal read from the third line memory by the signal writing and reading means by the third coefficient generated by the coefficient generating means;

a fourth multiplier for multiplying the color difference signal read from the fourth line memory by the signal writing and reading means by the fourth coefficient generated by the coefficient generating means;

a first adder for adding outputs of the first and second multipliers to generate a luminance signal whose space line position is shown by the second count means, and outputting the luminance signal; and a second adder for adding outputs of the third and fourth multipliers to generate a color difference signal whose space line position is shown by the third count means, and outputting the color difference signal.

5. The image pickup apparatus according to claim 4, further comprising step amount setting means for setting a count step amount of each of the second and third count means, wherein the signal writing and reading means switches a number of reading times of the luminance signals of one line or the color difference signals of one line written in each of the first to fourth line memories during a period of writing the luminance signals of one line or the color difference signals of one line into each of the first to fourth line memories.

6. The image pickup apparatus according to claim 4, wherein the signal writing and reading means reads the color difference signals of one line from the third and fourth line memories when the luminance signals of two lines are read from the first and second line memories.

* * * * *